(12) United States Patent
Padiyath et al.

(10) Patent No.: US 8,530,054 B2
(45) Date of Patent: Sep. 10, 2013

(54) SOLAR CONTROL MULTILAYER FILM

(75) Inventors: Raghunath Padiyath, Woodbury, MN (US); Zai-Ming Qiu, Woodbury, MN (US); James E. Thorson, Hudson, WI (US); Jung-Sheng Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 320 days.

(21) Appl. No.: 11/528,159

(22) Filed: Sep. 27, 2006

(65) Prior Publication Data

US 2008/0075947 A1    Mar. 27, 2008

(51) Int. Cl.
*B23B 5/16* (2006.01)

(52) U.S. Cl.
USPC ............ 428/421; 428/41.8; 428/323; 428/343

(58) Field of Classification Search
None
See application file for complete search history.

(56) References Cited

U.S. PATENT DOCUMENTS

| | | | | |
|---|---|---|---|---|
| 3,681,179 A * | 8/1972 | Theissen | | 428/336 |
| 4,389,452 A * | 6/1983 | Chahroudi et al. | | 428/215 |
| 4,463,047 A * | 7/1984 | Matteucci et al. | | 428/216 |
| 4,472,480 A | 9/1984 | Olson | | |
| 4,873,140 A | 10/1989 | McIntyre | | |
| 5,446,118 A | 8/1995 | Shen et al. | | |
| 5,591,530 A * | 1/1997 | Warner et al. | | 428/480 |
| 6,087,010 A * | 7/2000 | Yoshida et al. | | 428/421 |
| 6,111,697 A * | 8/2000 | Merrill et al. | | 359/497 |
| 6,254,973 B1 * | 7/2001 | Yoshida et al. | | 428/212 |
| 6,261,684 B1 * | 7/2001 | Takahashi et al. | | 428/345 |
| 6,376,572 B1 | 4/2002 | Turri | | |
| 6,673,425 B1 * | 1/2004 | Hebrink et al. | | 428/212 |
| 6,906,115 B2 * | 6/2005 | Hanazawa et al. | | 522/97 |
| 7,081,545 B2 | 7/2006 | Klun et al. | | |
| 2002/0037383 A1 | 3/2002 | Spillman | | |
| 2002/0090507 A1 * | 7/2002 | Barth et al. | | 428/336 |
| 2002/0114934 A1 * | 8/2002 | Liu et al. | | 428/212 |
| 2002/0176804 A1 * | 11/2002 | Strand et al. | | 422/100 |
| 2004/0234750 A1 | 11/2004 | Yen | | |
| 2005/0143541 A1 | 6/2005 | Caldwell et al. | | |
| 2005/0182199 A1 * | 8/2005 | Jing et al. | | 525/326.3 |
| 2005/0249940 A1 | 11/2005 | Klun et al. | | |
| 2005/0260414 A1 | 11/2005 | MacQueen | | |
| 2006/0147722 A1 | 7/2006 | Ohashi | | |
| 2006/0148350 A1 | 7/2006 | Chang et al. | | |

(Continued)

FOREIGN PATENT DOCUMENTS

| JP | 2000-177064 | 6/2000 |
|---|---|---|
| WO | WO 2005049687 A1 * | 6/2005 |
| WO | WO 2006/074168 | 7/2006 |

OTHER PUBLICATIONS

U.S. Appl. No. 11/423,782, filed Jun. 13, 2006, Coggio.

(Continued)

*Primary Examiner* — David Sample
*Assistant Examiner* — Adam Krupicka
(74) *Attorney, Agent, or Firm* — Jeffrey M. Olofson

(57) ABSTRACT

A multilayer film article is disclosed. The multilayer film article includes an infrared light reflecting multilayer film having alternating layers of a first polymer type and a second polymer type, a hardcoat layer that is the reaction product of a mixture that includes a curable, crosslinkable fluoro-acrylate-containing compound; a curable, crosslinkable non-fluorinated organic compound; infrared light absorbing nanoparticles; and a polymerization initiator. The hardcoat layer being disposed adjacent the multilayer film.

27 Claims, 1 Drawing Sheet

(56) References Cited

U.S. PATENT DOCUMENTS

| | | |
|---|---|---|
| 2006/0154049 A1 | 7/2006 | Padiyath et al. |
| 2006/0216500 A1 | 9/2006 | Klun |
| 2006/0216524 A1 | 9/2006 | Klun et al. |
| 2007/0171534 A1* | 7/2007 | Chien .......................... 359/642 |
| 2007/0287093 A1* | 12/2007 | Jing et al. .................... 430/270.1 |
| 2008/0047836 A1* | 2/2008 | Strand et al. ................... 204/644 |

OTHER PUBLICATIONS

ACS Symp. Ser. 2003, 849, 499-510; Chapter 41, UV-Curing of Fluorinated Systems; Synthesis and Properties, by Roberta Bongiovanni, Giulio Malucelli, and Aldo Priola.

Roberta Bongiovanni, Giulio Malucelli, Antonino Pollicino, Claudio Tonelli, Giovanni Simeone, Aldo Priola, Macromol. Chem. Phys. 199, 1099-1105, 1998.

B. Ameduri, Roberta Bongiovanni, Giulio Malucelli, Antonio Pollicino and Aldo Priola, J. Polymer Science, Part A; Polymer Chemistry, 37, 77-87, 1999.

Roberta Bongiovanni, Giulio Malucelli, and Aldo Priola. Pigment & Resin Technology, 28 (1), 26-30, 1999.

U.S. Appl. No. 11/267,790, filed Nov. 5, 2005, Wheatley.

U.S. Appl. No. 11/279,800, filed Apr. 14, 2006, Qiu.

U.S. Appl. No. 11/279,803, filed Apr. 14, 2006, Qiu.

U.S. Appl. No. 11/279,813, filed Apr. 14, 2006, Qiu.

* cited by examiner

SOLAR CONTROL MULTILAYER FILM

BACKGROUND

The present invention generally relates to solar control multilayer film. The present invention more particularly relates to solar control multilayer film that includes infrared absorbing nanoparticles and fluoromaterials that impart desirable properties.

Dyed and vacuum-coated plastic films have been applied to windows to reduce heat load due to sunlight. To reduce heat load, solar transmission is blocked in either the visible or the infrared portions of the solar spectrum, i.e., at wavelengths ranging from 400 nm to 2500 nm or greater.

Primarily through absorption, dyed films can control the transmission of visible light and consequently provides glare reduction. However, dyed films generally do not block near-infrared solar energy and consequently are not completely effective as solar control films. Dyed films also often fade with solar exposure. In addition, when films are colored with multiple dyes, the dyes often fade at different rates, causing an unwanted color changes over the life of the film.

Other known window films are fabricated using vacuum-deposited grey metals, such as stainless steel, inconel, monel, chrome, or nichrome alloys. The deposited grey metal films offer about the same degrees of transmission in the visible and infrared portions of the solar spectrum. As a result, the grey metal films are an improvement over dyed films with regard to solar control. The grey metal films are relatively stable when exposed to light, oxygen, and/or moisture, and in those cases in which the transmission of the coatings increases due to oxidation, color changes are generally not detectable. After application to clear glass, grey metals block light transmission by approximately equal amounts of solar reflection and absorption.

Vacuum-deposited layers such as silver, aluminum, and copper control solar radiation primarily by reflection and are useful only in a limited number of applications due to the high level of visible reflectance. A modest degree of selectivity (i.e., higher visible transmission than infrared transmission) is afforded by certain reflective materials, such as copper and silver.

There is a need for improved solar control film that has a high visible light transmission and substantially blocks infrared radiation, and has desirable cleaning and scratch resistant properties.

SUMMARY

Generally, the present invention relates to solar control multilayer film. The present invention more particularly relates to solar control multilayer film that includes infrared absorbing nanoparticles and fluoromaterials that impart desirable properties.

The invention includes articles having an infrared light reflecting multilayer film having alternating layers of a first polymer type and a second polymer type; and a hardcoat layer disposed on the multilayer film, wherein the hardcoat layer includes infrared light absorbing nanoparticles dispersed therein and wherein the hardcoat layer has a static contact angle of water that is greater than 70 degrees, and a static contact angle of hexadecane that is greater than 50 degrees.

The invention also includes articles having an infrared light reflecting multilayer film having alternating layers of a first polymer type and a second polymer type; and a hardcoat layer disposed on the multilayer film, wherein the hardcoat layer is the reaction product of a mixture that includes at least one curable, crosslinkable fluoro-acrylate-containing compound; at least one curable, crosslinkable non-fluorinated compound; infrared light absorbing nanoparticles; and at least one polymerization initiator.

Exemplary fluoro-acrylate-containing compounds include:

$$R_f QXC(O)NH))_m - R_i - (NHC(O)OQ(A)_a)_n \quad \text{(Formula 1)}$$

wherein $R_i$ is a residue of a multi-isocyanate. Representative $R_i$ includes, but is not limited to,

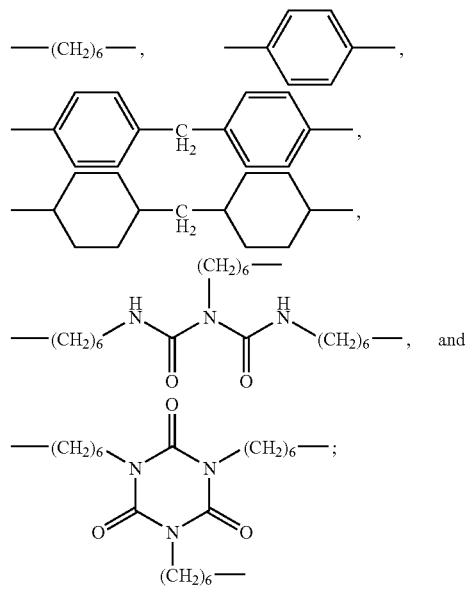

X is O, S or NR, where R is H or lower alkyl of 1 to 4 carbon atoms;

$R_f$ is a monovalent perfluoropolyether moiety composed of groups comprising the formula $F(R_{fc}O)_x C_d F_{2d}-$, wherein each $R_{fc}$ independently represents a fluorinated alkylene group having from 1 to 6 carbon atoms. Exemplary monovalent perfluoropolyethers of $R_{fc}O$ include, but are not limited to, those that have perfluorinated repeating units of $-(C_p F_{2p})-$, $-(C_p F_{2p} O)-$, $-(CF(Z))-$, $-(CF(Z)O)-$, $-(CF(Z)C_p F_{2p} O)-$, $-(C_p F_{2p} CF(Z)O)-$, $-(CF_2 CF(Z)O)-$, or combinations thereof. In these repeating units, p is typically an integer of 1 to 10. In some embodiments, p is an integer of 1 to 8, 1 to 6, 1 to 4, or 1 to 3. The group Z is F, a perfluoroalkyl group, perfluoroether group, perfluoropolyether, or a perfluoroalkoxy group, all of which can be linear, branched, or cyclic. The Z group typically has no more than 12 carbon atoms, no more than 10 carbon atoms, no more than 9 carbon atoms, no more than 4 carbon atoms, no more than 3 carbon atoms, no more than 2 carbon atoms, or no more than 1 carbon atom. In some embodiments, the Z group can have no more than 4 oxygen atoms, no more than 3 oxygen atoms, no more than 2 oxygen atoms, no more than 1 oxygen atoms, or no oxygen atoms. In these perfluoropolyether structures, the different repeating units can be distributed randomly along the chain. $C_d F_{2d}$ can be linear or branched. Each x independently represents an integer greater than or equal to 2, and wherein d is an integer from 1 to 8; The number average molecular weight of $R_f$ can be from 400 to 5000, in another embodiment from 800 to 4000, and in yet another embodiment from 1000 to 3000.

Q is independently a connecting group of valency at least 2, including, but not limited to $-C(O)NR(CH_2)_n-$, $-C(O)$ NRCH$_2$CH(CH$_2$—)CH$_2$—, —C(O)NRCH$_2$CH(CH$_2$—)$_2$, —(CH$_2$)$_h$—, —SO$_2$NR(CH$_2$)$_h$—, —(CH$_2$)$_h$—O—(CH$_2$)$_j$—, —(CH$_2$)$_h$—S—(CH$_2$)$_j$—, —CH$_2$C[(CH$_2$—)]$_3$ wherein R is H or lower alkyl of 1 to 4 carbon atoms, h is from 1 to 30, and j is from 2 to 20;

A is a (meth)acryl functional group —XC(O)C(R$^2$)═CH$_2$, wherein R$^2$ is a lower alkyl of 1 to 4 carbon atoms or H or F;

m is at least 1;

n is at least 1;

a is 1 to 6, with the proviso that m+n is 2 to 10, and in which each unit referred to by the subscripts m and n is attached to an R$_i$ unit.

Specific examples of compounds that fit within Formula (1) are shown below

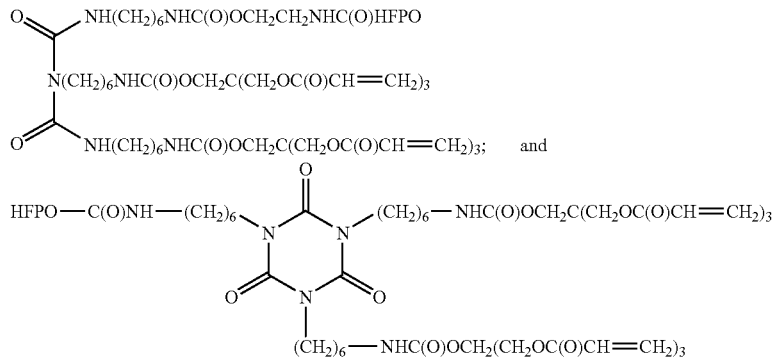

Other exemplary fluoro-acrylate-containing compounds include:

$$R_{f2}\text{-}[Q\text{-}(XC(O)NHQOC(O)C(R^2)\!=\!CH_2)_a]_g \quad \text{(Formula 5)}$$

wherein X, Q, R$^2$ and a are as defined above; and g is 1 or 2;

R$_{f2}$ is either a monovalent perfluoropolyether moiety composed of groups comprising the formula F(R$_{fc}$O)$_x$C$_d$F$_{2d}$— or a divalent perfluoropolyether moiety composed of groups comprising the formula —C$_d$F$_{2d}$O(R$_{fc}$O)$_x$C$_d$F$_{2d}$—, in which R$_{fc}$, x, and d are as defined above. The number average molecular weight of R$_f$ can be from 400 to 5000, 800 to 4000, and 1000 to 3000.

Examples of specific fluoro-acrylate-containing compounds that can be utilized in hardcoat compositions of the invention include, but are not limited to, HFPO—C(O)NHC$_2$H$_4$OC(O)NHC$_2$H$_4$OC(O)C(CH$_3$)═CH$_2$, HFPO—[C(O)NHC$_2$H$_4$OC(O)NHC$_2$H$_4$OC(O)C(CH$_3$)═CH$_2$]$_2$, HFPO—C(O)NHCH$_2$CH[OC(O)NHC$_2$H$_4$OC(O)C(CH$_3$)═CH$_2$]CH$_2$OC(O)NHC$_2$H$_4$OC(O)C(CH$_3$)═CH, HFPO—C(O)NHC(C$_2$H$_5$)(CH$_2$OC(O)NHC$_2$H$_4$OC(O)C(CH$_3$)═CH$_2$)$_2$, CH$_2$═C(CH$_3$)C(O)O C$_2$H$_4$NHC(O)OC$_2$H$_4$NHC(O)—HFPO—C(O)NHC$_2$H$_4$OC(O)NHC$_2$H$_4$OC(O)C(CH$_3$)═CH$_2$, or combinations thereof.

Still other exemplary fluoro-acrylate-containing compounds include:

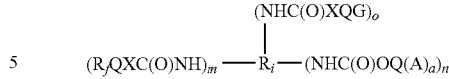

wherein R$_i$, X, R$_f$, Q, a, m, n, and A are as identified before; and

G is alkyl, aryl, alkaryl, aralkyl group, substituted alkyl/aryl group with functional group or a combination thereof. Representative examples of functional groups include, but are not limited to, —Si(OMe)$_3$, —(C$_2$H$_4$O)$_i$R$^3$, and —CO$_2$R$^3$;

wherein R$^3$ is a alkyl of 1 to 30 carbon atoms, and i is from 5 to 5000;

o is at least 1;

Still other exemplary fluoro-acrylate-containing compounds include:

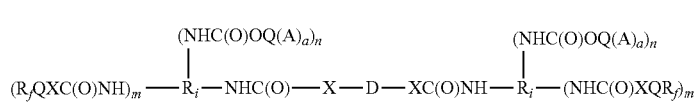

wherein R$_f$, Q, X, A, R$_i$, m, a, and n are as defined above; and

D is a divalent or q-valent isocyanate reactive group containing residue, D(XH)$_q$, examples of which include alkylene, arylene, alkarylene, fluoroalkylene, perfluoroalkylene, or aralkylene, which can be linear, brianched or cyclic, optionally include heteroatoms such as O, N, and S. q is from 2 to 6. In one embodiment q is 2.

Formula 4 is the reaction product from R$_i$(NCO)$_{m+n+1}$ and D(XH)$_2$, such as a diol, dithiol or diamine to form (OCN)$_{m+n}$R$_i$—NHC(O)X-D-XC(O)NH—R$_i$(NCO)$_{m+n}$, followed by the reaction with R$_f$-Q-XH and (A)$_a$-Q-OH. Multi-isocyanate reactive chemical, D(XH)$_q$, could also have been used to obtain compounds similar to Formula 4 by replacing D(XH)$_2$. Representative diols of D(QXH)$_q$, where q is 2, include, but are not limited to, non-fluorinated diol such as HO(CH$_2$)$_2$OH, HO(CH$_2$)$_4$OH, HO(CH$_2$)$_6$OH, HO(CH$_2$)$_{10}$OH and HO(CH$_2$)$_2$O(CH$_2$)$_2$OH; fluorochemical diols such as HOCH$_2$(CF$_2$)$_4$CH$_2$OH, C$_4$F$_9$SO$_2$N(CH$_2$CH$_2$OH)$_2$, HFPO—C(O)NHCH$_2$CH$_2$CH$_2$N(CH$_2$CH$_2$OH)$_2$, HOCH$_2$CH$_2$NHC(O)—HFPO—C(O)NHCH$_2$CH$_2$OH, HOCH$_2$CH$_2$NHC(O)—CF$_2$(OCF$_2$)$_{x1}$(CF$_2$CF$_2$O)$_{x2}$CF$_2$—

$C(O)NHCH_2CH_2OH$, $HOCH_2$—$CF_2(OCF_2)_{x1}(CF_2CF_2O)_{x2}$ $CF_2$—$CH_2OH$, and $H(OCH_2C(CH_3)(CH_2OCH_2CF_3)CH_2)_x$ OH (Fox-Diol, having a MW about 1342 and available from Omnova Solutions Inc. of Akron, Ohio); and functionalized diol such as $CH_3N(CH_2CH_2OH)_2$, hydantoin hexaacrylate (HHA), prepared as described in Example 1 of U.S. Pat. No. 4,262,072 to Wendling et al, and $CH_2$=$C(CH_3)C(O)$ $OCH_2CH(OH)CH_2O(CH_2)_4OCH_2CH(OH)CH_2OC(O)C$ $(CH_3)$=$CH_2$.

When D contains —$C_dF_{2d}O(R_{fe}O)_xC_dF_{2d}$—, m is optionally zero.

Yet other exemplary fluoro-acrylate-containing compounds include fluoro-acrylate-non-urethane compounds of Formula 5:

(Formula 5)

wherein $R_{f2}$ is a monovalent perfluoropolyether moiety composed of groups comprising the formula $F(R_{fe}O)_x$ $C_dF_{2d}$—, or divalent perfluoropolyether group composed of groups comprising the formula —$C_dF_{2d}O(R_{fe}O)_xC_dF_{2d}$— with number average molecular weight 400 to 5000, in one embodiment 800 to 4000, in another embodiment 1000 to 3000, wherein $R_{fe}$, d, and x are as defined above;

Q is as identified before; and $R_A$ is a is a free-radically reactive such as (meth)acryl, allyl, or vinyl, group; a is 1 to 6, and g is 1 or 2.

Exemplary fluoro-acrylate-non-urethane compounds with (meth)acryl group of Formula 5 that can be utilized in hardcoat compositions of the invention include, but are not limited to, HFPO—$C(O)NHCH_2CH_2OC(O)CH$=$CH_2$, HFPO—$C(O)NHCH_2CH_2OC(O)C(CH_3)$=$CH_2$, HFPO—$[C(O)NHCH_2CH_2OC(O)CH$=$CH_2]_2$, HFPO—$C(O)NHCH_2CH$=$CH_2$, HFPO—$[C(O)NHCH_2CH$=$CH_2]_2$, HFPO—$C(O)NHCH_2CH_2OCH_2$ $CH_2OC(O)CH$=$CH_2$, HFPO—$[C(O)NHCH_2CH_2OCH_2CH_2OCH_2CH_2OC(O)$ $CH$=$CH_2]_2$, HFPO—$C(O)NH$—$(CH_2)_6OC(O)CH$=$CH_2$, HFPO—$C(O)NHC(CH_2OC(O)CH$=$CH_2)_3$, HFPO—$C(O)$ $N(CH_2CH_2OC(O)CH$=$CH_2)_2$, HFPO—$C(O)$ $NHCH_2CH_2N(C(O)CH$=$CH_2)$ $CH_2OC(O)CH$=$CH_2$, HFPO—$C(O)NHC(CH_2OC(O)CH$=$CH_2)_2H$, HFPO—$C(O)NHC(CH_2OC(O)CH$=$CH_2)_2CH_3$, HFPO—$C(O)NHC(CH_2OC(O)CH$=$CH_2)_2CH_2CH_3$, HFPO—$C(O)NHCH_2CH(OC(O)CH$=$CH_2)CH_2OC(O)CH$=$CH_2$, HFPO—$[C(O)NHCH_2CH(OC(O)CH$=$CH_2)CH_2OC(O)CH$=$CH_2]_2$, HFPO—$C(O)NHCH_2CH_2CH_2N(CH_2CH_2OC(O)$ $CH$=$CH_2)_2$, HFPO—$C(O)OCH_2C(CH_2OC(O)CH$=$CH_2)_3$, $CH_2$=$CHC(O)OCH_2CH(OC(O))$—HFPO) $CH_2OCH_2CH(OH)CH_2OCH_2CH(OC(O))$—HFPO) $CH_2OCOCH$=$CH_2$, HFPO—$CH_2OCH_2CH(OC(O)$ $CH$=$CH_2)CH_2OC(O)CH$=$CH_2$, HFPO—$CH_2OC(O)$ $CH$=$CH_2$, HFPO—$CH_2CH_2OC(O)CH$=$CH_2$, HFPO— $CH_2CH_2OC(O)C(CH_3)$=$CH_2$, HFPO— $CH_2CH_2OCH_2CH_2OC(O)CH$=$CH_2$, or combinations thereof.

Still other exemplary fluoro-acrylate-containing compounds include:

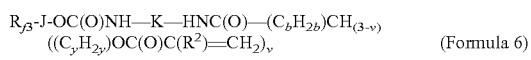

(Formula 6)

wherein, $R_{f3}$ is a monovalent perfluoroalkyl group or a polyfluoroalkyl group which can be linear, branched, or cyclic. Exemplary $R_{f3}$ includes, but is not limited to, $C_dF_{2d+1}$—, wherein d is 1 to 8; $CF_3CF_2CF_2CHFCF_2$—; $CF_3CHFO(CF_2)_3$—; $(CF_3)_2NCF_2CF_2$—; $CF_3CF_2CF_2OCF_2CF_2$—; $CF_3CF_2CF_2OCHCF_2$—; n-$C_3F_7OCF(CF_3)$—; $H(CF_2CF_2)_3$—; or n-$C_3F_7OCF(CF_3)CF_2OCF_2$—.

J is a divalent linkage group, selected from, but not limited to,

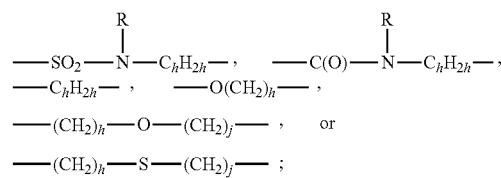

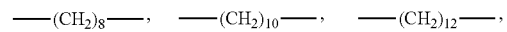

R is H or an alkyl group of 1 to 4 carbon atoms;
h is 1 to 30;
j is 2 to 10;
K is the residue of a diisocyanate with an unbranched symmetric alkylene group, arylene group, or aralkylene group; Exemplary K includes, but is not limited to, —$(CH_2)_6$—,

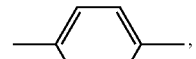

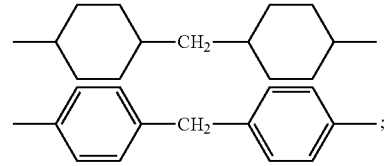

b is 1 to 30;
v is 1 to 3;
y is 1 to 6; and
$R^2$ is H, $CH_3$, or F.

Exemplary fluoro-acrylate-compounds with (meth)acryl group of Formula 6 that can be utilized in hardcoat compositions of the invention include, but are not limited to, $C_4F_9SO_2N(CH_3)C_2H_4O$—$C(O)NHC_6H_5CH_2C_6H_5NHC$ $(O)$—$OC_2H_4OC(O)CH$=$CH_2$(MeFBSE-MDI-HEA), $C_4F_9SO_2N(CH_3)C_2H_4O$—$C(O)NH(CH_2)_6NHC(O)$— $OC_2H_4OC(O)Me$=$CH_2$ (MeFBSE-HDI-HEMA), $C_4F_9SO_2N(CH_3)C_2H_4O$—$C(O)NH(CH_2)_6NHC(O)$— $OC_4H_8OC(O)CH$=$CH_2$ (MeFBSE-HDI-BA), $C_4F_9SO_2N$ $(CH_3)C_2H_4O$—$C(O)NH(CH_2)_6NHC(O)$—$OC_{12}H_{24}OC(O)$ $CH$=$CH_2$ (MeFBSE-HDI-DDA), $CF_3CH_2O$—$C(O)$ $NHC_6H_5CH_2C_6H_5NHC(O)$—$OC_2H_4OC(O)CH$=$CH_2$ ($CF_3CH_2OH$-MDI-HEA), $C_4F_9CH_2CH_2O$—$C(O)$ $NHC_6H_5CH_2C_6H_5NHC(O)$—$OC_2H_4OC(O)CH$=$CH_2$ ($C_4F_9CH_2CH_2OH$-MDI-HEA), $C_6F_{13}CH_2CH_2O$—$C(O)$ $NHC_6H_5CH_2C_6H_5NHC(O)$—$OC_2H_4OC(O)CH$=$CH_2$ ($C_6F_{13}CH_2CH_2OH$-MDI-HEA), $C_3F_7CHFCF_2CH_2O$—$C(O)NHC_6H_5CH_2C_6H_5NHC(O)$—$OC_2H_4OC(O)CH$=$CH_2$ ($C_3F_7CHFCF_2CH_2OH$-MDI-HEA), $CF_3CHFO(CF_2)_3$ $CH_2O$—$C(O)NHC_6H_5CH_2C_6H_5NHC(O)$—$OC_2H_4OC(O)$ $CH$=$CH_2$($CF_3CHFO(CF_2)_3CH_2O$-MDI-HEA), $C_3F_7OCHFCF_2CH_2O$—$C(O)NHC_6H_5CH_2C_6H_5NHC(O)$— $OC_2H_4OC(O)CH$=$CH_2$ ($C_3F_7OCHFCF_2CH_2OH$-MDI-HEA), $C_3F_7OCF(CF_3)CH_2O$—$C(O)NHC_6H_5$ $CH_2C_6H_5$ $NHC(O)$—$OC_2H_4OC(O)CH$=$CH_2$($C_3F_7OCF(CF_3)$ $CH_2OH$-MDI-HEA), $C_4F_9SO_2NMeC_2H_4O$—$C(O)$ $NHC_6H_4CH_2C_6H_4NHC(O)$—$OCH_2C(CH_2OC(O)$ $CH$=$CH_2)_3$(MeFBSE-MDI-(SR-444C)), or combinations thereof.

The invention also includes light control articles for blocking infrared light from an infrared light source that include an infrared light reflecting multilayer film having alternating layers of a first polymer type and a second polymer type; a hardcoat layer disposed on the multilayer film, wherein the hardcoat layer is the reaction product of a mixture that includes: a curable, crosslinkable fluoro-acrylate-containing compound; a curable, crosslinkable non-fluorinated organic compound; infrared light absorbing nanoparticles; and a polymerization initiator; and a substrate disposed adjacent the infrared light reflecting multilayer film.

BRIEF DESCRIPTION OF THE DRAWINGS

The present application may be more completely understood in consideration of the following detailed description of various embodiments of the invention in connection with the accompanying drawings, in which.

Figure 1:
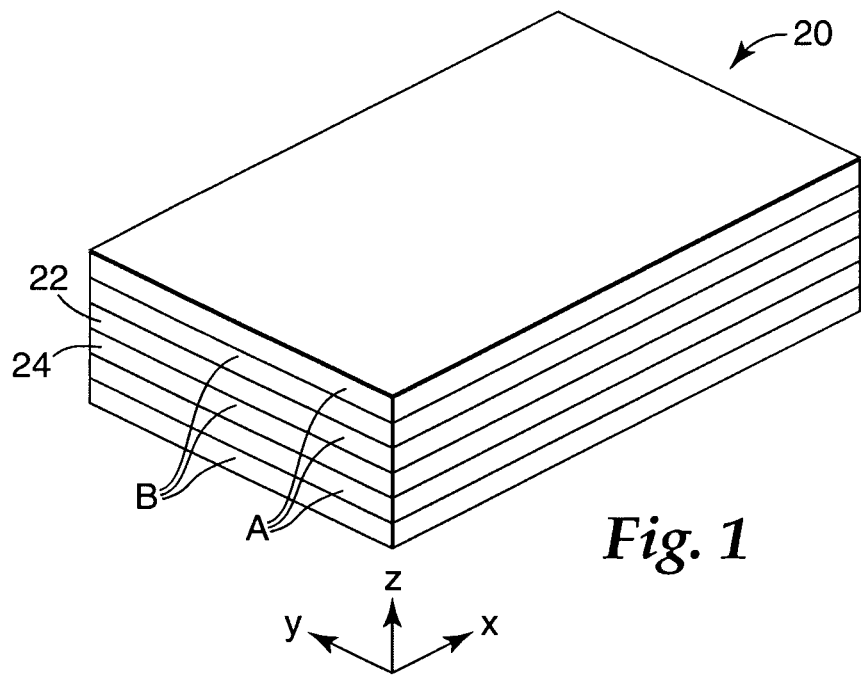
FIG. 1 is a perspective view of a multilayer film.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The solar control multilayer film of the present invention is believed to be applicable to a variety of applications needing solar control including, for example, architectural and transportation applications. In some embodiments, the solar control multilayer film article includes an infrared absorbing nanoparticle layer disposed on an infrared reflecting multilayer film. In other embodiments, the solar control multilayer film article includes an infrared reflecting multilayer film disposed between an infrared absorbing nanoparticle layer and an adhesive layer. The solar control film can be adhered to an optical substrate such as, for example, a glass substrate. These examples, and the examples discussed below, provide an appreciation of the applicability of the disclosed solar control multilayer film, but should not be interpreted in a limiting sense.

The term "polymer" or "polymeric" will be understood to include polymers, copolymers (e.g., polymers formed using two or more different monomers), oligomers and combinations thereof, as well as polymers, oligomers, or copolymers. Both block and random copolymers are included, unless indicated otherwise.

As used herein, "fluoro-acrylate-containing compound" or "fluoro-acrylate-containing additive"; or "fluoro-acrylate-non-urethane compound" or "fluoro-acrylate-non-urethane additive" can refer to a specific compound or a mixture of compounds.

Unless otherwise indicated, all numbers expressing feature sizes, amounts, and physical properties used in the specification and claims are to be understood as being modified in all instances by the term "about."0 Accordingly, unless indicated to the contrary, the numerical parameters set forth in the foregoing specification and attached claims are approximations that can vary depending upon the desired properties sought to be obtained by those skilled in the art utilizing the teachings disclosed herein.

The term "hard resin" or "hardcoat" means that the resulting cured polymer exhibits an elongation at break of less than 50 or 40 or 30 or 20 or 10 or 5 percent when evaluated according to the ASTM D-882-91 procedure. In some embodiments, the hard resin polymer can exhibit a tensile modulus of greater than 100 kpsi ($6.89 \times 10^8$ pascals) when evaluated according to the ASTM D-882-91 procedure. In some embodiments, the hard resin polymer can exhibit a haze value of less than 10% or less than 5% when tested in a Taber abrader according to ASTM D 1044-99 under a load of 500 g and 50 cycles (haze can be measured with Haze-Gard Plus, BYK-Gardner, MD, haze meter).

As used in the context of the hardcoat composition, a "weight percent" or "wt-%" of a particular component refers to the amount (by weight) of the particular component in the hardcoat composition after the solvent has been removed from the hardcoat composition but before the hardcoat composition has been cured to form the hardcoat layer.

The term "adjacent" refers to one element being in close proximity to another element and includes the elements touching one another and further includes the elements being separated by one or more layers disposed between the elements.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" include plural referents unless the content clearly dictates otherwise. Thus, for example, reference to a composition containing "a nanoparticle layer" includes two or more nanoparticle layers. As used in this specification and the appended claims, the term "or" is generally employed in its sense including "and/or" unless the content clearly dictates otherwise.

This disclosure generally describes multilayer film that includes an infrared absorbing nanoparticle layer disposed on polymeric multilayer film. In many embodiments, an infrared light reflecting multilayer film has alternating layers of a first polymer type and a second polymer type, and an infrared light absorbing nanoparticle layer is adjacent the multilayer film. The nanoparticle layer includes a plurality of metal oxide nanoparticles. In some embodiments, the multilayer film is disposed adjacent to an optical substrate such as glass to form a solar control article. In some embodiments, the multilayer film has an average visible light transmission of at least 45% and an average infrared transmission for 780 nm to 2500 nm light of less than 15%.

FIG. 1 illustrates multilayer optical film 20. The film includes individual layers 22, 24. The layers have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For optical films designed to reflect light at ultraviolet, visible, or near-infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

The reflective and transmissive properties of multilayer optical film 20 are a function of the refractive indices of the respective layers (i.e., microlayers). Each layer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y- and z-axes, respectively (see FIG. 1). In practice, the refractive indices are controlled by judicious materials selection and processing conditions. Film 20 can be made by co-extrusion of typically tens or hundreds of layers of two alternating polymers A, B, followed by optionally passing the multilayer extrudate through one or more multiplication dies, and then stretching or otherwise orienting the extrudate to form a final film. The resulting film is composed of typically tens or hundreds of individual layers whose thicknesses and refractive indices are tailored to provide one or more reflection bands in desired region(s) of the spectrum, such as in the visible, near infrared, and/or infrared. In order to achieve high reflectivity with a reasonable number of layers, adjacent layers can exhibit a difference in refractive index ($\Delta n_x$) for light polarized along the x-axis of at least 0.05. In some embodiments, if the high reflectivity is desired for two orthogonal polarizations, then the adjacent layers also exhibit a difference in refractive index ($\Delta n_y$) for light polarized along the y-axis of at least 0.05. In other embodiments, the refractive index difference $\Delta n_y$ can be less than 0.05 or 0 to produce a multilayer stack that reflects normally incident light of one polarization state and transmits normally incident light of an orthogonal polarization state.

If desired, the refractive index difference ($\Delta n_z$) between adjacent layers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$, is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between layers can be controlled to be substantially less than the maximum in-plane refractive index difference $\Delta n_x$, such that $\Delta n_z \leq 0.5 \ast \Delta n_x$. In one embodiment, $\Delta n_z \leq 0.25 \ast \Delta n_x$. A zero or near zero magnitude z-index mismatch yields interfaces between layers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Multilayer optical films have been described in, for example, U.S. Pat. No. 3,610,724 (Rogers); U.S. Pat. No. 3,711,176 (Alfrey, Jr. et al.), "Highly Reflective Thermoplastic Optical Bodies For Infrared, Visible or Ultraviolet Light"; U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.) "Optical Film"; U.S. Pat. No. 6,045,894 (Jonza et al.) "Clear to Colored Security Film"; U.S. Pat. No. 6,531,230 (Weber et al.) "Color Shifting Film"; PCT Publication WO 99/39224 (Ouderkirk et al.) "Infrared Interference Filter"; and US Patent Publication 2001/0022982 A1 (Neavin et al.), "Apparatus For Making Multilayer Optical Films", all of which are incorporated herein by reference. In such polymeric multilayer optical films, polymer materials are used predominantly or exclusively in the makeup of the individual layers. Such films can be compatible with high volume manufacturing processes, and may be made in large sheets and roll goods.

The multilayer film can be formed by any useful combination of alternating polymer type layers. In many embodiments, at least one of the alternating polymer layers is birefringent and oriented. In some embodiments, one of the alternating polymer layer is birefringent and orientated and the other alternating polymer layer is isotropic. In one embodiment, the multilayer optical film is formed by alternating layers of a first polymer type including polyethylene terephthalate (PET) or copolymer of polyethylene terephthalate (coPET) and a second polymer type including poly(methyl methacrylate) (PMMA) or a copolymer of poly(methyl methacrylate) (coPMMA). In another embodiment, the multilayer optical film is formed by alternating layers of a first polymer type including polyethylene terephthalate and a second polymer type including a copolymer of poly(methyl methacrylate and ethyl acrylate). In another embodiment, the multilayer optical film is formed by alternating layers of a first polymer type including a glycolated polyethylene terephthalate (PETG—a copolymer ethylene terephthalate and a second glycol moiety such as, for example, cyclohexanedimethanol) or a copolymer of a glycolated polyethylene terephthalate (coPETG) and second polymer type including polyethylene naphthalate (PEN) or a copolymer of polyethylene naphthalate (coPEN). In another embodiment, the multilayer optical film is formed by alternating layers of a first polymer type including polyethylene naphthalate or a copolymer of polyethylene naphthalate and a second polymer type including poly(methyl methacrylate) or a copolymer of poly (methyl methacrylate). Useful combination of alternating polymer type layers are disclosed in U.S. Pat. No. 6,352,761 and U.S. Pat. No. 6,797,396, which are incorporated by reference herein.

Figure 2:
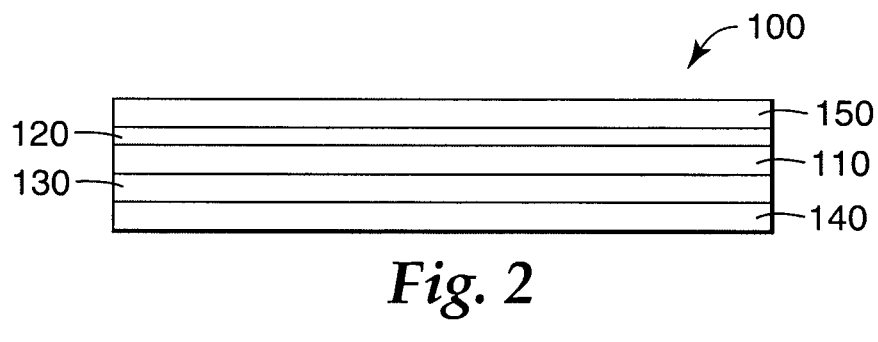
FIG. 2 schematically illustrates an embodiment of a solar control multilayer film article.

FIG. 2 schematically illustrates an embodiment of a solar control multilayer film article 100. The film 100 includes an infrared light reflecting multilayer film 110 having alternating layers of a first polymer type and a second polymer type, as described above. An infrared light absorbing hardcoat layer 120 is disposed adjacent the multilayer film 110. An adhesive layer 130 is disposed on the multilayer film 110. A release layer or substrate 140 is disposed on the adhesive layer 130. An optional second hardcoat layer 150 can be disposed adjacent the multilayer film 110.

In many embodiments, the film 100 includes an infrared light reflecting multilayer film 110 having alternating layers of a first polymer type and a second polymer type, as described above and a hardcoat layer 120 is disposed adjacent the multilayer film 110. In some embodiments, the hardcoat layer 120 includes a metal oxide dispersed within a cured polymeric binder. In some embodiments, this hardcoat layer 120 has a thickness in a range from 1 to 20 micrometers, or from 1 to 10 micrometers, or from 1 to 5 micrometers. An adhesive layer 130 is disposed on the multilayer film 110. A release layer or optical substrate 140 is disposed on the adhesive layer 130.

Figure 3:
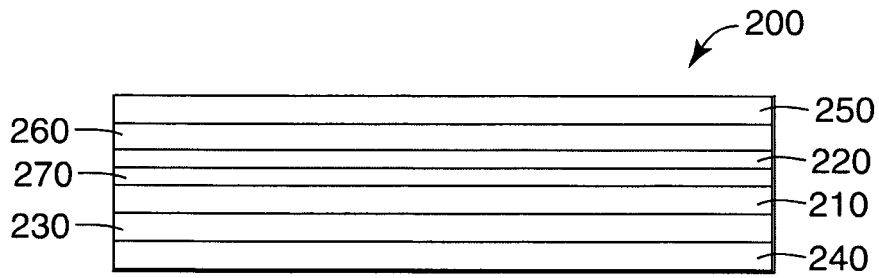
FIG. 3 schematically illustrates another embodiment of a solar control multilayer film article.

FIG. 3 schematically illustrates another embodiment of a solar control multilayer film article 200. The film 200 includes an infrared light reflecting multilayer film 210 having alternating layers of a first polymer type and a second polymer type, as described above. A hardcoat layer 220 is disposed adjacent the multilayer film 210. An optional intermediate adhesive layer 270 is disposed between the hardcoat layer 220 and the multilayer film 210. An adhesive layer 230 is disposed on the multilayer film 210. A release layer or optical substrate 240 can be disposed on the pressure sensitive adhesive layer 230. An optional second hardcoat layer 250 can be disposed adjacent the multilayer film 210. An optional intermediate polymeric layer 260 is disposed between the optional second hardcoat layer 250 and the intermediate adhesive layer 270.

The above multilayer film article constructions provide improved solar control film articles. In some embodiments, the multilayer film article has an average visible light transmission (400 to 780 nm) of at least 45% and an average infrared light transmission for 780 nm to 2500 nm light of less than 10% or less than 15%. In some embodiments, the multilayer film article has an average visible light transmission of at least 60% and an infrared light transmission of 20% or less for substantially all wavelengths between 950 nm and 2500 nm. In some embodiments, the multilayer film article has an average light reflection between 780 and 1200 nm of 50% or greater and an average light transmission between 1400 and 2500 nm of 50% or less. In further embodiments, the multilayer film article has an average light reflection between 780 and 1200 nm of 80% or greater and an average light transmission between 1400 and 2500 nm of 20% or less. In still further embodiments, the multilayer film article has an average light reflection between 780 and 1200 nm of 90% or greater and an average light transmission between 1400 and 2500 nm of 5% or less.

In one embodiment of the invention, the hardcoat layer that is formed from a hardcoat mixture includes infrared light absorbing materials, and the hardcoat layer has a static contact angle of water that is greater than 70 degrees. In yet another embodiment, the hardcoat layer has a static contact angle of water that is greater than 90 degrees. In a further embodiment, the hardcoat layer has a static contact angle of water that is greater than 100 degrees.

In one embodiment of the invention, the hardcoat layer has a static contact angle of hexadecane (oil) that is greater than 50 degrees.

In one embodiment of the invention, a combination of low surface energy (e.g. anti-soiling, stain resistant, oil and/or water repellency) and durability (e.g. abrasion resistance) are desirable properties for the hardcoat layer. The hardcoat layer can also function, in some embodiments of the invention, to decrease glare loss while improving durability and optical clarity.

The surface energy can be characterized by various methods such as contact angle and ink repellency, as determined by the test methods described in the Examples. In this application, "stain repellent" refers to a surface treatment exhibiting a static contact angle with water of at least 70 degrees. In one embodiment, the contact angle is at least 80 degrees and in another embodiment at least 90 degrees. Alternatively, or in addition thereto, the advancing contact angle with hexadecane is at least 50 degrees and in another embodiment at least 60 degrees. Low surface energy results in anti-soiling and stain repellent properties as well as rendering the exposed surface easy to clean. Another indicator of low surface energy relates to the extent to which ink from a pen or marker beads up when applied to the exposed surface. The surface layer and articles exhibit "ink repellency" when ink from pens and markers beads up into discrete droplets and can be easily removed by wiping the exposed surface with tissues or paper towels, such as tissues available from the Kimberly Clark Corporation, Roswell, Ga. under the trade designation "SURPASS FACIAL TISSUE."

Durability can be defined in terms of results from the combination of solvent resistance tests and abrasion resistance tests with Steel Wool obtained from Rhodes-American, a division of Homax Products, Bellingham, Wash. under the trade designation "#0000-Super-Fine", with 500 grams weight applied to the stylus and scratched for 300 times, as described in Examples.

In some embodiments, the metal oxide nanoparticles include indium tin oxide, doped indium tin oxide, antimony tin oxide, or doped antimony tin oxide dispersed in a polymeric material. The nanoparticle layer can have any useful thickness such as, for example, from 1 to 10 or 2 to 8 micrometers. The nanoparticle layer can include nanoparticles at any useful loading or wt % such as, for example, 30 to 90 wt %, 40 to 80 wt %, or 50 to 80 wt %. In many embodiments, the nanoparticle layer is nonconducting. Nanoparticle compositions are commercially available from, for example, Advanced Nano Products Co., LTD., South Korea, under the tradenames TRB-PASTE™ SM6080(B), SH7080, SL6060. In another embodiment, the metal oxide nanoparticles include zinc oxide and/or aluminum oxide, such oxides are available from GfE Metalle und Materialien GmbH, Germany.

The adhesive layer 130 described above can include any type of adhesive that enables the solar control multilayer film to be affixed to the substrate. In order to attach the solar control film to the glass, one surface of the solar control film is coated with the adhesive and a release sheet is removed from the adhesive layer before application of the film to the substrate. Ultra-violet absorption additives can be incorporated into the adhesive layer.

In one embodiment, the adhesive of the adhesive layer 130 is a pressure sensitive adhesive (PSA). In another embodiment, the adhesive is a moisture curable adhesive. In embodiments utilizing a PSA, the PSA is an optically clear PSA film such as a polyacrylate pressure sensitive adhesive. The Pressure-Sensitive Tape Council has defined pressure sensitive adhesives as material with the following properties: (1) aggressive and permanent tack, (2) adherence with no more than finger pressure, (3) sufficient ability to hold onto an adherent, (4) sufficient cohesive strength, and (5) requires no activation by an energy source. PSAs are normally tacky at assembly temperatures, which is typically room temperature or greater (i.e., about 20° C. to about 30° C. or greater). Materials that have been found to function well as PSAs are polymers designed and formulated to exhibit the requisite viscoelastic properties resulting in a desired balance of tack, peel adhesion, and shear holding power at the assembly temperature. The most commonly used polymers for preparing PSAs are natural rubber-, synthetic rubber- (e.g., styrene/butadiene copolymers (SBR) and styrene/isoprene/styrene (SIS) block copolymers), silicone elastomer-, poly alpha-olefin-, and various (meth) acrylate-(e.g., acrylate and methacrylate) based polymers. Of these, (meth)acrylate-based polymer PSAs have evolved as one class of PSA for the present invention due to their optical clarity, permanence of properties over time (aging stability), and versatility of adhesion levels, to name just a few of their benefits.

The release liner described above can be formed of any useful material such as, for example, polymers or paper and may include a release coat. Suitable materials for use in release coats include, but are not limited to, fluoropolymers, acrylics and silicones designed to facilitate the release of the release liner from the adhesive.

The substrate described above can be formed of any useful material and in many embodiments is an optical substrate. In some embodiments, the substrate is formed of a polymeric material such as, for example, cellulose triacetate, polycarbonate, polyacrylate, polypropylene, or polyethylene terephthalate. In other embodiments, the substrate is formed of an inorganic material such as, for example, quartz, glass, sapphire, YAG, or mica. The substrate can have any useful thickness. In one embodiment, the substrate is automotive or architectural glass. In some embodiments including clear glass substrates as a glazing system, the glazing system has a shading coefficient of 0.68 or less, or 0.6 or less, or 0.55 or less, or 0.50 or less, at a $T_{VIS}$ of 70% or greater.

The hardcoat layer can improve the durability of the substrate during processing and during use of the end product. The hardcoat layer can include any useful material, such as silica-based hardcoats, siloxane hardcoats, melamine hardcoats, acrylic hardcoats, and the like. The hardcoat can be any useful thickness such as, for example, from 1 to 20 micrometers, or 1 to 10 micrometers, or 1 to 5 micrometers.

In one embodiment of the invention, the hardcoat layer generally includes the reaction product of a mixture that includes a fluoro-acrylate-containing compound that is curable, and crosslinkable; a curable, crosslinkable non-fluorinated compound; an infrared light absorbing material; and a polymerization initiator.

In one embodiment of the present invention, the fluoro-acrylate-containing additive is a perfluoropolyether urethane having a monovalent perfluoropolyether moiety and a multi-acrylate terminal group. In such an embodiment, this exemplary additive can be combined with a conventional hydrocarbon-based (for example, an acrylate-based) hard coat material as the curable, crosslinkable, non-fluorinated compound. The additive is added at less than 10 wt-%, and in one embodiment less than 5 wt-%. In yet another embodiment, the additive is added between 0.05 and 5 wt-%.

Exemplary fluoro-acrylate-containing compounds include:

$$(R_fQXC(O)NH))_m—R_i—(NHC(O)OQ(A)_a)_n \quad \text{(Formula 1)}$$

wherein $R_i$ is a residue of a multi-isocyanate. Representative $R_i$ includes, but is not limited to, such as —(CH$_2$)$_6$—,

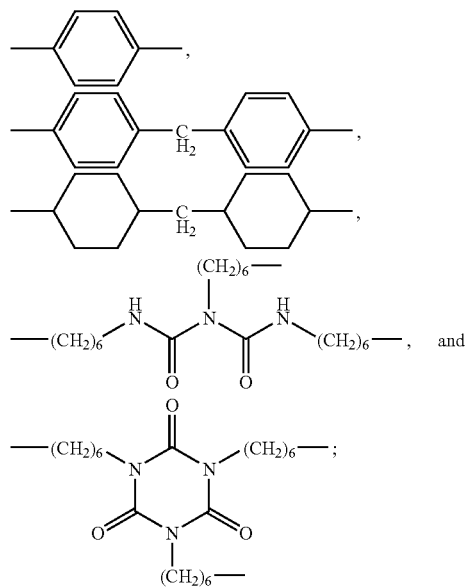

X is O, S or NR, where R is H or lower alkyl of 1 to 4 carbon atoms;

$R_f$ is a monovalent perfluoropolyether moiety composed of groups comprising the formula F(R$_{fc}$O)$_x$C$_d$F$_{2d}$—, wherein each R$_{fc}$ independently represents a fluorinated alkylene group having from 1 to 6 carbon atoms. Exemplary monovalent perfluoropolyethers of R$_{fc}$O include, but are not limited to, those that have perfluorinated repeating units of —(C$_p$F$_{2p}$)—, —(C$_p$F$_{2p}$O)—, —(CF(Z))-, —(CF(Z)O)—, —(CF(Z)C$_p$F$_{2p}$O)—, —(C$_p$F$_{2p}$CF(Z)O)—, —(CF$_2$CF(Z)O)—, or combinations thereof. In these repeating units, p is typically an integer of 1 to 10. In some embodiments, p is an integer of 1 to 8, 1 to 6, 1 to 4, or 1 to 3. The group Z is F, a perfluoroalkyl group, perfluoroether group, perfluoropolyether, or a perfluoroalkoxy group, all of which can be linear, branched, or cyclic. The Z group typically has no more than 12 carbon atoms, no more than 10 carbon atoms, no more than 9 carbon atoms, no more than 4 carbon atoms, no more than 3 carbon atoms, no more than 2 carbon atoms, or no more than 1 carbon atom. In some embodiments, the Z group can have no more than 4 oxygen atoms, no more than 3 oxygen atoms, no more than 2 oxygen atoms, no more than 1 oxygen atoms, or no oxygen atoms. In these perfluoropolyether structures, the different repeating units can be distributed randomly along the chain. Each x independently represents an integer greater than or equal to 2, and wherein d is an integer from 1 to 8; The number average molecular weight of $R_f$ can be from 400 to 5000, in another embodiment from 800 to 4000, in yet another embodiment from 1000 to 3000. C$_d$F$_{2d}$ can be linear or branched.

Q is independently a connecting group of valence at least 2, including, but not limited to —C(O)NR(CH$_2$)$_h$—, —C(O)NRCH$_2$CH(CH$_2$—)CH$_2$—, —C(O)NRCH$_2$CH(CH$_2$—)$_2$, —(CH$_2$)$_h$—, SO$_2$NR(CH$_2$)$_h$—, —(CH$_2$)$_h$—O—(CH$_2$)$_j$—, —(CH$_2$)$_h$—S—(CH$_2$)$_j$—, —CH$_2$C[(CH$_2$—)]$_3$ wherein R is H or a lower alkyl of 1 to 4 carbon atoms; h is from 1 to 30 and j is from 2 to 20;

A is a (meth)acryl functional group —XC(O)C(R$^2$)=CH$_2$, wherein R$^2$ is a lower alkyl of 1 to 4 carbon atoms or H or F, and X is as defined above;

m is at least 1;

n is at least 1;

a is 1 to 6, with the proviso that m+n is 2 to 10, and in which each unit referred to by the subscripts m and n is attached to an R$_i$ unit.

In one embodiment Q can be a straight or branched chain or cycle-containing connecting group. Q can include a covalent bond, an alkylene, an arylene, an aralkylene, an alkarylene. Q can optionally include heteroatoms such as O, N, and S, and combinations thereof. Q can also optionally include a heteroatom-containing functional group such as carbonyl or sulfonyl for example, and combinations thereof.

By their method of synthesis, these materials are necessarily mixtures. If the mole fraction of isocyanate groups is arbitrarily given a value of 1.0, then the total mole fraction of m and n units used in making materials of Formula (1) is 1.0 or greater. The mole fractions of m:n ranges from 0.95:0.05 to 0.05:0.95. In one embodiment, the mole fractions of m:n are from 0.50:0.50 to 0.05:0.95. In another embodiment, the mole fractions of m:n are from 0.25:0.75 to 0.05:0.95 and in yet another embodiment, the mole fractions of m:n are from 0.25:0.75 to 0.10:0.90. In the instances the mole fractions of m:n total more than one, such as 0.15:0.90, the m unit is reacted onto the isocyanate first, and a slight excess (0.05 mole fraction) of the n units are used.

In an exemplary formulation, for instance, in which 0.15 mole fractions of m and 0.85 mole fraction of n units are introduced, a distribution of products is formed in which some fraction of products formed contain no m units. There will, however, be present in this product distribution, materials of Formula (1).

Numerous diisocyanates (di-functional isocyanates), modified diisocyanate materials, and higher functional isocyanates may be used as $R_i$ in the present invention as the residue of multi-isocyanate and still fall within the scope of the present invention. In one embodiment, multifunctional materials based on hexamethylene diisocyanate ("HDI") are utilized. One commercially available derivative of HDI is Desmodur™ N100, available from Bayer Polymers LLC of Pittsburgh, Pa.

Further, other diisocyanates such as toluene diisocyanate ("TDI") or isophorone diisocyanate ("IPDI") may also be utilized as $R_i$ in the present invention. Non-limiting examples of aliphatic and aromatic isocyanate materials, for example, that may be used include, but are not limited to, Desmodur™ 3300, Desmodur™ TPLS2294, and Desmodur™ N3600, all obtained from Bayer Polymers LLC of Pittsburgh, Pa.

Materials used to make an additive of Formula (1) may be described by the Formula: $HOQ(A)_a$, and can be exemplified by, for instance, 1,3-glycerol dimethacrylate, available from Echo Resins Inc. of Versailles, Mo.; and pentaerythritol triacrylate, available as SR444C from Sartomer of Exton, Pa.

Typically, the additives of this embodiment can be made by first reacting the polyisocyanate with the perfluoropolyether—containing alcohol, thiol, or amine, followed by reaction with the hydroxyl functional multiacrylate, usually in a non-hydroxylic solvent and in the presence of a catalyst such as an organotin compound. Alternatively, the additives of this embodiment can be made by reacting the polyisocyanate with the hydroxyl functional multiacrylate, followed by reaction with the perfluoropolyether-containing alcohol, thiol, or amine, usually in a non-hydroxylic solvent and in the presence of a catalyst such as an organotin compound. In addition, the additives could also be made by reacting all three components simultaneously, usually in a non-hydroxylic solvent and in the presence of a catalyst such as an organotin compound.

A specific example of a compound that fits within Formula (1) is shown below:

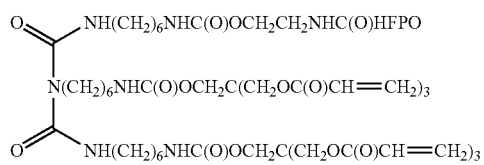

which is the reaction product of the biuret of HDI with one equivalent of HFPO oligomer amidol ($F(CF(CF_3)CF_2O)_xCF(CF_3)$—$C(O)NHCH_2CH_2OH$) and further with two equivalents of pentaerythritol triacrylate, wherein "x" averages 2 to 15. In some embodiments, x averages between 3 and 10 or x averages between 5 and 8.

Another specific example of a compound of Formula (1) is

In another embodiment, the fluoro-acrylate-containing additive can be of Formula (2):

$$R_{f2}\text{-}[Q\text{-}(XC(O)NHQOC(O)C(R^2)\!\!=\!\!CH_2)_a]_g \qquad \text{(Formula 2)}$$

wherein X, Q, and $R^2$ are as defined above;
a is from 1 to 6; and
g is 1 or 2;
$R_{f2}$ is either a monovalent perfluoropolyether moiety composed of groups comprising the formula $F(R_{fc}O)_xC_dF_{2d}$— or a divalent perfluoropolyether moiety composed of groups comprising the formula —$C_dF_{2d}O(R_{fc}O)_xC_dF_{2d}$—, in which $R_{fc}$, x, and d are as defined above, and $C_dF_{2d}$ can be linear or branched.

$R_{f2}$ can be monovalent or divalent. In some compounds where $R_{f2}$ is monovalent, the terminal groups can be $(C_pF_{2p+1})$—, $(C_pF_{2p+1}O)$—, $(X'C_pF_{2p}O)$—, or $(X'C_pF_{2p+1})$— where X' is hydrogen, chlorine, or bromine and p is an integer of 1 to 10. In some embodiments of monovalent $R_{f2}$ groups, the terminal group is perfluorinated and p is an integer of 1 to 10, 1 to 8, 1 to 6, 1 to 4, or 1 to 3. Exemplary monovalent $R_{f2}$ groups include $CF_3O(C_2F_4O)_xCF_2$—, $C_3F_7O(CF_2CF_2CF_2O)_x CF_2CF_2$—, and $C_3F_7O(CF(CF_3)CF_2O)_xCF(CF_3)$— wherein x has an average value of 0 to 50, 1 to 50, 3 to 30, 3 to 15, or 3 to 10.

Exemplary structures for divalent $R_{f2}$ groups include, but are not limited to, —$CF_2O(CF_2O)_{x1}(C_2F_4O)_{x2}CF_2$—, —$(CF_2)_3O(C_4F_8O)_x(CF_2)_3$—, —$CF_2O(C_2F_4O)_xCF_2$—, —$CF_2CF_2O(CF_2CF_2CF_2O)_xCF_2CF_2$—, and —$CF(CF_3)(OCF_2CF(CF_3))_{x1}OC_dF_{2d}O(CF(CF_3)CF_2O)_{x2}CF(CF_3)$—, wherein x1 and x2 independently have an average value of 0 to 50, 1 to 50, 3 to 30, 3 to 15, or 3 to 10; the sum of x1 and x2 has an average value of 1 to 50 or 4 to 40; and d is an integer of 1 to 8.

In one embodiment, the average molecular weight (number average) of $R_{f2}$ is 400 to 5000, in another embodiment 800 to 4000, in another embodiment 1000 to 3000.

Exemplary HFPO-substituted urethane acrylates of Formula 2 that can be utilized in hardcoat compositions of the invention include the reaction of HFPO-polyols, HFPO-polymercapotan or HFPO-polyamine with $CH_2$=$C(CH_3)C(O)OCH_2CH_2NCO$, such as, HFPO—$C(O)NHC_2H_4OC(O)NHC_2H_4OC(O)C(CH_3)$=$CH_2$, HFPO—$(O)NHC(C_2H_5)(CH_2OC(O)NHC_2H_4OC(O)C(CH_3)$=$CH_2)_2$, HFPO—$C(O)NHC_2H_4OC(O)NHC_2H_4OC(O)C(CH_3)$=$CH_2]_2$, HFPO—$C(O)NHC(C_2H_5)(CH_2OC(O)NHC_2H_4OC(O)C(CH_3)$=$CH_2)_2]_2$, HFPO—$C(O)NHCH_2CH[OC(O)NHC_2H_4OC(O)C(CH_3)$=$CH_2]CH_2OC(O)NHC_2H_4OC(O)C(CH_3)$=$CH$, HFPO—$C(O)NHC(C_2H_5)(CH_2OC(O)NHC_2H_4OC(O)C(CH_3)$=$CH_2)_2$, $CH_2$=$C(CH_3)C(O)O$ $C_2H_4NHC(O)OC_2H_4NHC(O)$—HFPO—$C(O)NHC_2H_4OC(O)NHC_2H_4OC(O)C(CH_3)$=$CH_2$, HFPO—$C(O)NHC_2H_4SC(O)NHC_2H_4OC(O)C(CH_3)$=$CH_2$, $CH_2$=$C(CH_3)C(O)OC_2H_4NHC(O)SC_2H_4NHC(O)$—HFPO—$C(O)NHC_2H_4SC(O)NHC_2H_4OC(O)C(CH_3)$=$CH_2$, HFPO—C

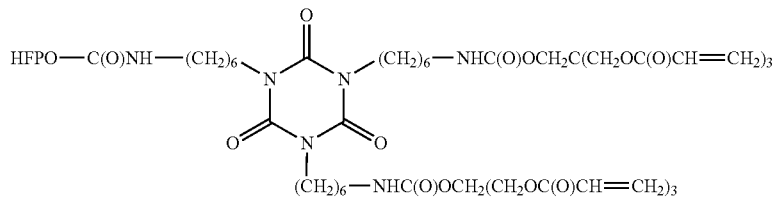

(O)NH(C₂H₄N(C(O)NHC₂H₄OC(O)C(CH₃)=CH₂)₄ C₂H₄NHC(O)—HFPO, or combinations thereof.

In another embodiment, a fluoro-acrylate-additive that can be used in a hardcoat composition of the invention is given by Formula (3):

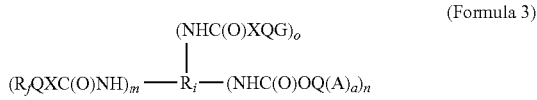

(Formula 3)

wherein $R_i$, X, $R_f$, Q, a, m, n, and A are as identified before; and o is at least 1;

G is alkyl, aryl, alkaryl, aralkyl group, substituted alkyl/aryl group with functional group or a combination thereof G also optionally has heteroatom-containing functional groups such as carbonyl, sulfonyl, polyethyleneoxide or combinations thereof. Further, G may have a combination of heteroatoms and heteroatom-containing functional groups. Representative examples of functional groups include, but are not limited to, —Si(OMe)₃, —(C₂H₄O)ᵢR³, and —CO₂R³; wherein R³ is alkly group having 1 to 30 carbon atoms, and i is from 5 to 5000;

G optionally contains pendant or terminal reactive groups. The optional reactive group of G may include (meth)acryl groups, vinyl groups, allyl groups and —Si(OR⁴)₃ groups, where R⁴ is a lower alkyl of 1 to 4 carbon atoms. G also optionally has fluoroalkyl or perfluoroalkyl groups.

HXQG used in making materials of Formula (3) may be monoalcohol, monothiol or monoamine, including, but not limited to, such as n-C₁₂H₂₅OH, n-C₁₈H₃₇OH, n-C₁₈H₃₇O(C₂H₄O)ᵢH, CH₃O(C₂H₄O)ᵢH, wherein i is from 5 to 5000, C₄F₉SO₂N(CH₃)CH₂CH₂OH, H₂NCH₂CH₂CH₂(SiOCH₃)₃, HSCH₂CH₂CH₂Si(OCH₃)₃, HO(CH₂)₅CO₂C₂H₄OC(O)CH=CH₂ and HEA (hydroxyethylacrylate). In one embodiment, (m+n+o) is equal to $N_{NCO}$, the number of isocyanate groups originally appended to $R_i$. In one embodiment, and the ratio of (m+n+o)/$N_{NCO}$ may be slightly greater than 1, contributed from the excess of n, and in which each unit referred to by the subscripts m, n, and o is attached to an $R_i$ unit.

In another embodiment, an additive that can be used in a hardcoat composition of the invention is given by Formula (4), which itself represents a mixture:

could also been used for making compounds of Formula 4 by replacing D(XH)₂ with D(XH)_q. Optionally, HXQG could be presented in Formula 4.

In this embodiment, when making the polyol, polyamine or polythiol extended polyisocyanate by the addition of D(XH)_q to $R_i(NCO)_{m+n+1}$, care should be taken in choosing the ratios, the reaction concentration and the amounts of D(XH)_q to avoid highly crosslinked urethane polymer gels. For instance, if a trifunctional isocyanate is to be used with a multifunctional alcohol, the amount of multifunctional alcohol should be limited to avoid forming a gelled crosslinked network. In one embodiment, the formulation is primarily based on diols when the number of c in $R_i(NCO)_c$ is higher than 2, wherein c is equal to m+n+1.

Representative diols of D(XH)_q, include, but are not limited to, are non-fluorinated diols such as HO(CH₂)₂OH, HO(CH₂)₄OH, HO(CH₂)₆OH, HO(CH₂)₁₀OH and HO(CH₂)₂O(CH₂)₂OH; fluorinated diols such as HOCH₂(CF₂)₄CH₂OH, C₄F₉SO₂N(CH₂CH₂OH)₂, HFPO—C(O)NHCH₂CH₂CH₂N(CH₂CH₂OH)₂, HOCH₂CH₂NHC(O)—HFPO—C(O)NHCH₂CH₂OH, HOCH₂CH₂NHC(O)—CF₂(OCF₂)ₓ₁(CF₂CF₂O)ₓ₂CF₂—C(O)NHCH₂CH₂OH, HOCH₂—CF₂(OCF₂)ₓ₁(CF₂CF₂O)ₓ₂CF₂—CH₂OH, H(OCH₂C(CH₃)(CH₂OCH₂CF₃)CH₂)ₓOH (Fox-Diol, having a MW about 1342 and available from Omnova Solutions Inc. of Akron, Ohio); and functionalized diol such as CH₃N(CH₂CH₂OH)₂ and hydantoin hexaacrylate (HHA), prepared as described in Example 1 of U.S. Pat. No. 4,262,072 to Wendling et al, and CH₂=C(CH₃)C(O)OCH₂CH(OH)CH₂O(CH₂)₄OCH₂CH(OH)CH₂OC(O)C(CH₃)=CH₂.

When D contains —C_dF_{2d}O(R_{fc}O)_xC_dF_{2d}—, m can optionally be zero.

For each of the formulas (i.e. Formulas 1-4) described herein, when X is O, Q is typically not methylene and thus contains two or more carbon atoms. In some embodiments, X is S or NR. In some embodiments, Q is an alkylene having at least two carbon atoms. In other embodiments, Q is a straight chain, branched chain, or cycle-containing connecting group selected from arylene, aralkylene, and alkarylene. In yet other embodiments, Q is a straight chain, branched chain, or cycle-containing connecting group containing a heteroatom such as O, N, and S and/or a heteroatom containing functional groups such as carbonyl and sulfonyl. In other embodiments, Q is a branched or cycle-containing alkylene group that optionally contains heteroatoms selected from O, N, S and/or a heteroa-

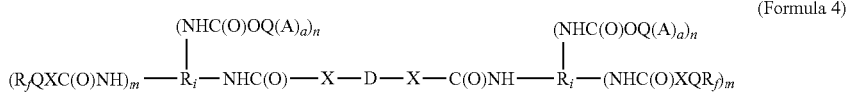

(Formula 4)

wherein $R_f$, Q, X, A, $R_i$, m, a, and n are as defined above; and

D is a divalent or q-valent isocyanate reactive group containing residue from D(XH)_q, examples of which include alkylene, arylene, alkarylene, fluoroalkylene, perfluoroalkylene, or aralkylene, which can optionally include heteroatoms such as O, N, and S. q is from 2 to 6.

Compounds of Formula 4 can be obtained from the reaction of $R_i(NCO)_{m+n+1}$ with D(XH)₂, such as a diol, dithiol or diamine to form (OCN)_{m+n}$R_i$—NHC(O)X-D-XC(O)NH—$R_i(NCO)_{m+n}$, followed by the reaction with $R_f$-Q-XH and (A)a-Q-OH. Multi-isocyanate reactive chemical, D(XH)_q, tom-containing functional group such as carbonyl and sulfonyl. In some embodiments Q contains a nitrogen containing group such as amide.

In another embodiment, a fluoro-acrylate-containing additive with a non-urethane linkage group can be utilized. These compounds have a linking group that can include a divalent group selected from an alkylene, arylene, or combinations thereof and optionally containing a divalent group selected from carbonyl, ester, amide, thioester or sulfonamido, and combinations thereof. In other embodiments, the linking group is a sulfur-containing heteroalkylene group containing a divalent group selected from carbonyl, ester, amide, thioester or sulfonamido, and combinations thereof. In other embodiments, the linking group is an oxygen-containing heteralkylene group containing a divalent group selected from carbonyl, ester, thioester, sulfonamido, and combinations thereof. In yet other embodiments, the linking group is a nitrogen-containing heteroalkylene group containing a divalent group selected from carbonyl, amide, thioester, or sulfonamido, and combinations thereof.

Exemplary fluoro-acrylate-non-urethane additives that can be used in a hardcoat composition of the invention can be given by Formula (5):

(Formula 5)

wherein $R_{f2}$ is a monovalent perfluoropolyether moiety composed of groups comprising the formula $F(R_{fc}O)_x C_dF_{2d}$—, or divalent perfluoropolyether group composed of groups comprising the formula —$C_dF_{2d}O(R_{fc}O)_xC_dF_{2d}$— with number average molecular weight about 400 to 5000; in one embodiment about 800 to 4000; and in another embodiment about 1000 to 3000, wherein $R_{fc}$, d, and x are as defined above; $C_dF_{2d}$ may be linear or branched;

W is a linking group; and $R_A$ is a is a free-radically reactive group such as (meth) acryl, allyl, or vinyl, group; a is 1 to 6, and g is 1 or 2.

As synthesized, compounds according to Formula (5) typically include a mixture of $R_{f2}$ groups. The average structure is the structure averaged over the mixture components. The average molecular weight of $R_{f2}$ is generally at least about 400. Compounds of Formula (5) often have a molecular weight (number average) of 400 to 5000, 800 to 4000, or 1000 to 3000.

The linking group W between the perfluoropolyether segment and (meth)acryl or —COCF=$CH_2$ endgroup includes a divalent group selected from an alkylene, arylene, heteroalkylene, or combinations thereof and an optional divalent group selected from carbonyl, ester, amide, sulfonamido, or combinations thereof. W can be unsubstituted or substituted with an alkyl, aryl, halo, or combinations thereof. The W group typically has no more than 30 carbon atoms. In some compounds, the W group has no more than 20 carbon atoms, no more than 10 carbon atoms, no more than 6 carbon atoms, or no more than 4 carbon atoms. For example, W can be an alkylene, an alkylene substituted with an aryl group, or an alkylene in combination with an arylene or an alkyl ether or alkyl thioether linking group.

The perfluoropolyether acrylate compounds (e.g. of Formula 5) can be synthesized by known techniques such as described in U.S. Pat. Nos. 3,553,179 and 3,544,537 as well as U.S. Pat. No. 7,094,829, "Fluorochemical Composition Comprising a Fluorinated polymer and Treatment of a Fibrous Substrate Therewith".

Exemplary fluoro-acrylate-non-urethane compounds of Formula 5 that can be utilized in hardcoat compositions of the invention include, but are not limited to, for example HFPO—[C(O)NHCH$_2$CH$_2$OCH$_2$CH$_2$OCH$_2$CH$_2$OC(O)CH=CH$_2$]$_{1~2}$, HFPO—[C(O)NH—(CH$_2$)$_6$OC(O)CH=CH]$_{1~2}$, HFPO—[C(O)NHC(CH$_2$OC(O)CH=CH$_2$)$_3$]$_{1~2}$, HFPO—[C(O)N(CH$_2$CH$_2$OC(O)CH=CH$_2$)$_2$]$_{1~2}$, HFPO—[C(O)NHCH$_2$CH$_2$N(C(O)CH=CH$_2$)CH$_2$OC(O)CH=CH$_2$]$_{1~2}$; HFPO—[C(O)NHC(CH$_2$OC(O)CH=CH$_2$)$_2$H]$_{1~2}$, HFPO—[C(O)NHC(CH$_2$OC(O)CH=CH$_2$)$_2$CH$_3$]$_{1~2}$, HFPO—[C(O)NHC(CH$_2$OC(O)CH=CH$_2$)$_2$CH$_2$CH$_3$]$_{1~2}$, HFPO—[C(O)NHCH$_2$CH(OC(O)CH=CH$_2$)CH$_2$OC(O)CH=CH$_2$]$_{1~2}$, HFPO—[C(O)NHCH$_2$CH$_2$CH$_2$N(CH$_2$CH$_2$OC(O)CH=CH$_2$)$_2$]$_{1~2}$, HFPO—[C(O)OCH$_2$C(CH$_2$OC(O)CH=CH$_2$)$_3$]$_{1~2}$, CH$_2$=CHC(O)OCH$_2$CH(OC(O)—HFPO)CH$_2$OCH$_2$CH(OH)CH$_2$OCH$_2$CH(OC(O)—HFPO)CH$_2$OCOCH=CH$_2$, HFPO—CH$_2$OCH$_2$CH(OC(O)CH=CH$_2$)CH$_2$OC(O)CH=CH$_2$, HFPO—CH$_2$OC(O)CH=CH$_2$, HFPO—CH$_2$CH$_2$OC(O)CH=CH$_2$, HFPO—CH$_2$CH$_2$OC(O)C(CH$_3$)=CH$_2$, HFPO—CH$_2$CH$_2$OCH$_2$CH$_2$OC(O)CH=CH$_2$, (CH$_2$=CHC(O)O)CH$_2$CH(OC(O)C(CH$_3$)=CH$_2$)CH$_2$NHC(O)—HFPO—C(O)NHCH$_2$CH(OC(O)C(CH$_3$)=CH$_2$)CH$_2$OC(O)C(CH$_3$)=CH$_2$, and combinations thereof.

More (per)fluoropolyether acryl compounds described such as in U.S. Publication No. US 2005/0250921A1 and US Publication No. 2005/0249940, incorporated herein by reference.

In other embodiments, the fluoro-acrylate-non-urethane compound may be a compound prepared by Michael-type addition of a reactive (per)fluoropolyether with a poly(meth) acrylate, such as the adduct of HFPO—C(O)N(H) CH$_2$CH$_2$CH$_2$N(H)CH$_3$ with trimethylolpropane triacrylate (TMPTA). Such (per)fluoropolyether acrylate compounds are further described in U.S. Pat. No. 7,101,618.

Other exemplary fluoro-acrylate-non-urethane compounds that can be utilized in compositions of the invention include those disclosed in U.S. Pat. Nos. 3,810,874 and 4,321,404. A representative compound is given by the structure CH$_2$=CHC(O)OCH$_2$CF$_2$O(CF$_2$CF$_2$O)$_{x1}$(CF$_2$O)$_{x2}$CH$_2$OC(O)CH=CH$_2$, where x1 and x2 designate that the number of randomly distributed perfluoroethyleneoxy and perfluoromethyleneoxy backbone repeating units, respectively, x1 and x2 have independent values, for example from 1 to 50, and the ratio of x1/x2 is 0.2 to 1 to 5/1.

Still other fluoro-acrylate-non-urethane compounds include vinyl compounds such as HFPO—[C(O)NHCH$_2$CH=CH$_2$]$_{1~2}$, and HFPO—[C(O)NHCH$_2$CH$_2$OCH=CH$_2$]$_{1~2}$.

These fluoro-acrylate containing additives or the fluoro-acrylate-non-urethane containing additives can both be employed as the sole perfluoropolyether containing additive in a hardcoat composition. Alternatively, however, the fluoro-acrylate-urethane-containing additive(s) described herein may be employed in combination with the fluoro-acrylate-non-urethane containing compounds. In these embodiments, the two additives can be added to the hardcoat composition such that the weight ratio of the fluoro-acrylate-containing additive to the fluoro-acrylate-non-urethane-additives is 1:1, in one embodiment 2:1 and in another embodiment 3:1. Within these exemplary ratios it is possible to have the total weight percent fluorine(F) of the curable mixture comprise from 0.5-25 wt-% F, in one embodiment 0.5 to 10 wt-% F and in another embodiment 0.5 to 5 wt-% F. In one exemplary additive, the perfluoropolyether moiety of the fluoro-acrylate-containing additive can be a HFPO moiety and the fluorinated moiety of the fluoro-acrylate-non-urethane additive can be a HFPO.

In one synergistic combination, a perfluoropolyether urethane having a perfluoropolyether moiety and a multi-(meth) acryl terminal group is employed in combination with a (non-urethane) monofunctional perfluoropolyether compound having a perfluoropolyether moiety linked to a (meth)acryl group. Typically, the perfluoropolyether moiety is a terminal group of the compound. Likewise, the (meth)acryl group is also typically a terminal group. In another embodiment, the second (non-urethane) perfluoropolyether compound typically has a higher weight percent fluorine than the perfluoropolyether urethane multi-(meth)acryl compound. It is surmised that the monofunctional perfluoropolyether compound is the major contributor to the high contact angles; whereas the perfluoropolyether urethane multi-(meth)acryl compound compatibilizes the monofunctional perfluoropolyether compound. This interaction can allow higher concentration of monofunctional perfluoropolyether compound to be incorporated without phase separation. In yet another embodiment, a perfluoropolyether urethane having a perfluoropolyether moiety and a multi-(meth)acryl terminal group is employed in combination with a (non-urethane) multi-functional perfluoropolyether compound having a perfluoropolyether moiety linked to at least two (meth)acryl group. Alternatively, a perfluoropolyether urethane monoacrylate can be employed in combination with a (non-urethane) mono-or multi-(meth) acryl perfluoropolyether compound.

The fluorocarbon- and urethane (meth)acryl additives (e.g. such as those of Formulas (1), (2), (3) or (4), optionally in combination with various other (per)fluoropolyether (meth) acryl compounds, may also be combined with one or more other (non-urethane) fluorinated compounds to improve the compatibility of the mixture.

In another embodiment a fluoro-acrylate-containing additive of the invention can be represented by Formula 6:

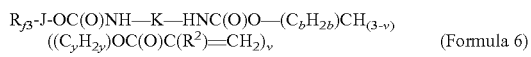  (Formula 6)

wherein, $R_{f3}$ is a monovalent perfluoroalkyl group or a polyfluoroalkyl group which can be linear, branched, or cyclic. Exemplary $R_{f3}$ includes, but not limited to, $C_dF_{2d+1}$—, wherein d is 1 to 8; $CF_3CF_2CF_2CHFCF_2$—; $CF_3CHFO(CF_2)_3$—; $(CF_3)_2NCF_2CF_2$—; $CF_3CF_2CF_2OCF_2CF_2$—; $CF_3CF_2CF_2OCHCF_2$—; $n\text{-}C_3F_7OCF(CF_3)$—; $H(CF_2CF_2)_3$—; no $n\text{-}C_3F_7OCF(CF_3)CF_2OCF_2$—.

J is a divalent linkage group, selected from, but not limited to,

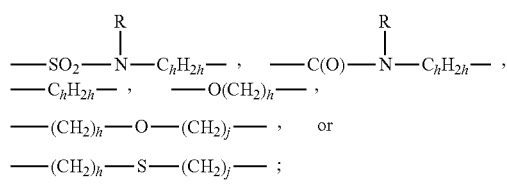

R is H or an alkyl group of 1 to 4 carbon atoms;
h is 1 to 30;
j is 2 to 10;
K is the residue of a diisocyanate with an unbranched symmetric alkylene group, arylene group, or aralkylene group. Exemplary K includes, but is not limited to, —(CH$_2$)$_6$—,

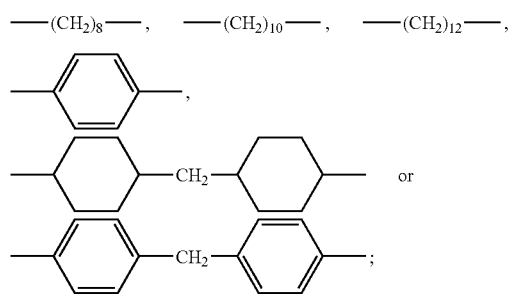

b is 1 to 30;
y is 1 to 5;
v is 1 to 3; and
$R^2$ is H, CH$_3$, or F.

In one embodiment, $R_{f3}$ is a perfluoroalkyl group that includes at least one heteroatom, or a polyfluoroalkyl group that includes at least one heteroatom. Examples of heteroatoms that can be included in either the perfluoroalkyl groups or polyfluroalkyl groups include, but are not limited to, O and N. Specific examples of possible perfluoroalkyl groups, polyfluoroalkyl groups, perfluroalkyl groups including at least one heteroatom, and polyfluoroalkyl groups including at least one heteroatom include, but are not limited to, $C_dF_{2d+1}$, wherein d is 1 to 8; $CF_3CF_2CF_2CHFCF_2$—; $CF_3CHFO(CF_2)_3$—; $(CF_3)_2NCF_2CF_2$—; $CF_3CF_2CF_2OCF_2CF_2$—; $CF_3CF_2CF_2OCHCF_2$—; $n\text{-}C_3F_7OCF(CF_3)$—; $H(CF_2CF_2)_3$—; or $n\text{-}C_3F_7OCF(CF_3)CF_2OCF_2$—.

In one embodiment J is

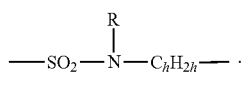

In another embodiment J is

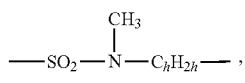

where h is 2 to 4.

In another embodiment J is

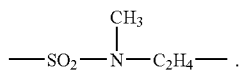

In one embodiment, K is

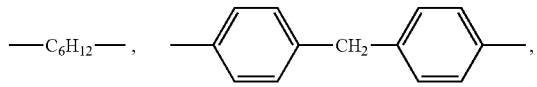

In another embodiment, K is

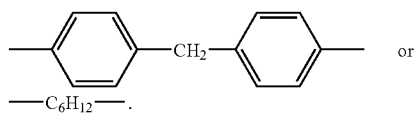

In one embodiment, b is 2 to 12; in another embodiment, b is 2, 4, 6, 10, or 12; in yet another embodiment, b is 2, 4, or 12.

In one embodiment, $R^2$ is H.

In one embodiment, v is 1 or 3.

Specific fluoro-acrylate-additives of Formula 6 useful in hardcoat compositions of the invention may include, but are not limited to, $C_4F_9SO_2N(CH_3)C_2H_4O$—C(O)NHC$_6$H$_5$CH$_2$C$_6$H$_5$NHC(O)—OC$_2$H$_4$OC(O)CH═CH$_2$ (MeFBSE-MDI-HEA), $C_4F_9SO_2N(CH_3)C_2H_4O$—C(O)NH(CH$_2$)$_6$NHC(O)—OC$_2$H$_4$OC(O)Me═CH$_2$(MeFBSE-HDI- HEMA), $C_4F_9SO_2N(CH_3)C_2H_4O$—$C(O)NH(CH_2)_6NHC$(O)—$OC_4H_8OC(O)CH$=$CH_2$(MeFBSE-HDI-BA), $C_4F_9SO_2N(CH_3)C_2H_4O$—$C(O)NH(CH_2)_6NHC(O)$—$OC_{12}H_{24}OC(O)CH$=$CH_2$ (MeFBSE-HDI-DDA), $CF_3CH_2O$—$C(O)NHC_6H_5CH_2C_6H_5NHC(O)$—$OC_2H_4OC$(O)CH=$CH_2$ ($CF_3CH_2OH$-MDI-HEA), $C_4F_9CH_2CH_2O$—$C(O)NHC_6H_5CH_2C_6H_5NHC(O)$—$OC_2H_4OC(O)CH$=$CH_2$ ($C_4F_9CH_2CH_2OH$-MDI-HEA), $C_6F_{13}CH_2CH_2O$—$C(O)$$NHC_6H_5CH_2C_6H_5NHC(O)$—$OC_2H_4OC(O)CH$=$CH_2$ ($C_6F_{13}CH_2CH_2OH$-MDI-HEA), $C_3F_7CHFCF_2CH_2O$—$C$(O)$NHC_6H_5CH_2C_6H_5NHC(O)$—$OC_2H_4OC(O)CH$=$CH_2$ ($C_3F_7CHFCF_2CH_2OH$-MDI-HEA), $CF_3CHFO(CF_2)_3$$CH_2O$—$C(O)NHC_6H_5CH_2C_6H_5NHC(O)$—$OC_2H_4OC(O)$$CH$=$CH_2$ ($CF_3CHFO(CF_2)_3CH_2O$-MDI-HEA), $C_3F_7$$OCHFCF_2CH_2O$—$C(O)NHC_6H_5CH_2C_6H_5NHC(O)$—$OC_2H_4OC(O)CH$=$CH_2$ ($C_3F_7OCHFCF_2CH_2OH$-MDI-HEA), $C_3F_7OCF(CF_3)CH_2O$—$C(O)NHC_6H_5CH_2$—$C_6H_5$$NHC(O)$—$OC_2H_4OC(O)CH$=$CH_2$ ($C_3F_7OCF(CF_3)$$CH_2OH$-MDI-HEA), $C_4F_9SO_2NMeC_2H_4O$—$C(O)$$NHC_6H_4CH_2C_6H_4NHC(O)$—$OCH_2C(CH_2OC(O)$$CH$=$CH_2)_3$ (MeFBSE-MDI-(SR-444C)), and combinations thereof. The preparation of fluoro-acrylate-additives of Formula 6 has been described in U.S. Publication No. US 2005/0143541A1, incorporated herein by reference.

These fluoro-acrylate-additives of the invention can be prepared, for example, by first combining a fluorochemical alcohol and an unbranched symmetric diisocyanate in a selected solvent, and then adding a hydroxy-terminated alkyl (meth)acrylate. Useful solvents include, but are not limited to, aromatic solvents (for example, toluene), aliphatic solvent such as hexane, heptane, pentane, cyclic pentane and cyclic hexane; fluorinated solvent such as $C_4F_9OCH_3$, $C_4F_9OCH_2CH_3$ and $C_3F_7OCH_3$, or combinations thereof.

Generally, the reaction mixture can be agitated. The reaction can generally be carried out at a temperature between room temperature and about 120° C.; in one embodiment, the reaction can be carried out at between 30° C. and 70° C. for improved selectivity.

Typically the reaction can be carried out in the presence of a catalyst. Useful catalysts include, but are not limited to, bases (for example, tertiary amines, alkoxides, and carboxylates), metal salts and chelates, organometallic compounds, acids and urethanes. In one embodiment, the catalyst is an organotin compound (for example, dibutyltin dilaurate (DBTDL) or a tertiary amine (for example, diazobicyclo[2.2.2]octane (DABCO)), or a combination thereof. In another embodiment, the catalyst is DBTDL.

Fluorochemical alcohols that are useful to form fluoro-acrylate-additives of the invention can be represented by formula 7:

$$R_{f3}\text{-J-OH} \qquad \text{Formula 7}$$

wherein $R_{f3}$ is a perfluoroalkyl group or a polyfluoroalkyl group, J is a divalent linkage group, selected from, but not limited to,

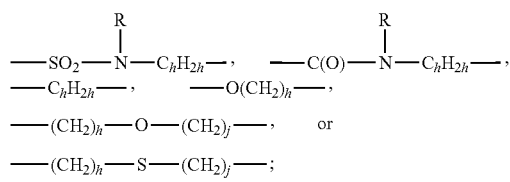

R is hydrogen or an alkyl group of 1 to 4 carbon atoms; h is 1 to 30; and j is 2 to 10;

In one embodiment, $R_{f3}$ is a perfluoroalkyl group that includes at least one heteroatom, or a polyfluoroalkyl group that includes at least one heteroatom. Examples of heteroatoms that can be included in either the perfluoroalkyl groups or polyfluroalkyl groups include, but are not limited to, O and N. Specific examples of possible perfluoroalkyl groups, polyfluoroalkyl groups, perfluroalky groups including at least one heteroatom, and polyfluoroalkyl groups including at least one heteroatom include, but are not limited to, $C_dF_{2d+1}$, wherein e is 1 to 8; $CF_3CF_2CF_2CHFCF_2$—; $CF_3CHFO(CF_2)_3$—; $(CF_3)_2$ $NCF_2CF_2$—; $CF_3CF_2CF_2OCF_2CF_2$—; $CF_3CF_2$$CF_2OCHCF_2$—; n-$C_3F_7OCF(CF_3)$—; $H(CF_2CF_2)_3$—; or n-$C_3F_7OCF(CF_3)CF_2OCF_2$—.

In one embodiment, d is 1 to 8; in another embodiment, d is 4 to 6.

In one embodiment, h is 2 to 4.

In one embodiment, J is

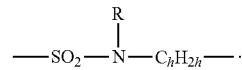

In another embodiment J is

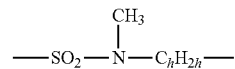

where j is 2 to 4. In another embodiment J is

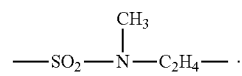

In yet another embodiment J is

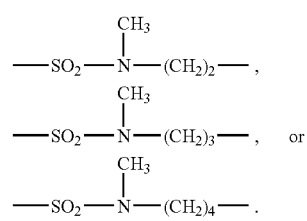

In one embodiment, fluorochemical alcohols that can be utilized to form fluoro-acrylate-additives of the invention include, but are not limited to, $C_4F_9SO_2NCH_3(CH_2)_2OH$, $C_4F_9SO_2NCH_3(CH_2)_4OH$, and $C_4F_9(CH_2)_2OH$. In another embodiment, the fluorochemical alcohol is $C_4F_9SO_2NCH_3(CH_2)_2OH$.

Representative examples of suitable alcohols include, but are not limited to, $CF_3CH_2OH$, $(CF_3)_2CHOH$, $(CF_3)_2$$CFCH_2OH$, $C_2F_5SO_2NH(CH_2)_2OH$, $C_2F_5SO_2NCH_3(CH_2)_2$$OH$, $C_2F_5SO_2NCH_3(CH_2)_4OH$, $C_2F_5SO_2NC_2H_5(CH_2)_6OH$, $C_2F_5(CH_2)_4OH$, $C_2F_5CONH(CH_2)_4OH$, $C_3F_7SO_2NCH_3$$(CH_2)_3OH$, $C_3F_7SO_2NH(CH_2)_2OH$, $C_3F_7CH_2OH$, $C_3F_7CONH(CH_2)_8OH$, $C_4F_9SO_2NCH_3(CH_2)_2OH$, $C_4F_9CONH(CH_2)_2OH$, $C_4F_9SO_2NCH_3(CH_2)_4OH$, $C_4F_9SO_2NH(CH_2)_7OH$, $C_4F_9SO_2NC_3H_7(CH_2)_2OH$, $C_4F_9SO_2NC_4H_9(CH_2)_2OH$, $C_5F_{11}SO_2NCH_3(CH_2)_2OH$, $C_5F_{11}CONH(CH_2)_2OH$, $C_5F_{11}(CH_2)_4OH$, $C_dF_{2d+1}(CH_2)_2$ OH, $C_dF_{2d+1}(CH_2)_2O(CH_2)_2OH$, $C_dF_{2d+1}(CH_2)_2S(CH_2)_2OH$, wherein d is 1 to 8; $CF_3CF_2CF_2CHFCF_2OH$, $CF_3CHFO(CF_2)_3OH$, $(CF_3)_2NCF_2CF_2OH$, $CF_3CF_2CF_2OCF_2CF_2OH$, $CF_3CF_2CF_2OCHCF_2OH$, n-$C_3F_7OCF(CF_3)OH$, $H(CF_2CF_2)_3OH$, or n-$C_3F_7OCF(CF_3)CF_2OCF_2OH$.

Representative examples of unbranched symmetric diisocyanates that can be utilized to form fluoro-acrylate-additives of the invention, include, but are not limited to, 4,4'-diphenylmethane diisocyanate (MDI), 1,6-hexamethylene diisocyanate (HDI), 1,4-phenylene diisocyanate (PDI), 1,4-butane diisocyanate (BDI), 1,8-octane diisocyanate (ODI), 1,12-dodecane diisocyanate, and 1,4-xylylene diisocyanate (XDI). In one embodiment, unbranched symmetric diisocyanates include, but are not limited to, MDI, HDI, and PDI. In another embodiment the unbranched symmetric diisocyanate that is utilized is MDI. In its pure form, MDI is commercially available as Isonate™ 125M from Dow Chemical Company (Midland, Mich.), and as Mondur™ from Bayer Polymers (Pittsburgh, Pa.).

Hydroxy-terminated alkyl (meth)acrylates that are useful to form fluoro-acrylate-additives of the invention can have from 2 to 30 carbon atoms. In another embodiment, hydroxyl-terminated alkyl (meth) acrylates that have from 2 to 12 carbon atoms in their alkylene portion are utilized.

In one embodiment, the hydroxy-terminated alkyl (meth) acrylate monomer is a hydroxy-terminated alkyl acrylate. In one embodiment hydroxy-terminated alkyl acrylates include, but are not limited to, hydroxy ethyl acrylate, hydroxy butyl acrylate, hydroxy hexyl acrylate, hydroxy decyl acrylate, hydroxy dodecyl acrylate, $HOCH_2$—$C_6H_{10}$—$CH_2OC(O)CR$=$CH_2$ and $HO(CH_2)_5C(O)OCH_2CH_2OC(O)CH$=$CH_2$, and mixtures thereof. In another embodiment, the hydroxyl-terminated alkyl meth(acrylate) monomer is a triacrylate such as pentaerythritol triacrylate, referred to herein as SR444C, available from Sartomer Company.

One exemplary combination to form fluoro-acrylate-additives of the invention includes the reaction of fluorochemical alcohols represented by the formula $C_dF_{2d+1}SO_2NCH_3(CH_2)_h$ OH, wherein d=2 to 5, and h=2 to 4, are reacted with MDI, the process described in U.S. Pat. No. 7,081,545, entitled "Process For Preparing Fluorochemical Monoisocyanates", can be used.

The hardcoat composition that ultimately forms from the hardcoat layer also includes infrared light absorbing particles. In one embodiment, the infrared light absorbing particles are chosen to create an article with an acceptable level of haze. Generally, particles in an optical layer begin to have an effect on haze as the particles increase in size. In one embodiment, particles that are a factor of 10× smaller than the relevant wavelengths (i.e. visible light) will not impact the haze of the layer to an unacceptable degree. In one embodiment, an article with haze values below 5% is generally considered acceptable.

In one embodiment, the infrared light absorbing particles include metal oxide particles. Oxide nanoparticles are typically colored and absorb in the different portions of the electromagnetic spectrum. It can be desirable for a solar control article to have high visible light transmission while rejecting as much infrared radiation as possible. Infrared radiation generally refers to electromagnetic radiation between 780 nm and 2500 nm. In one embodiment, the concentration of metal oxide nanoparticles (such as those exemplified below) is generally chosen such that near 100% extinction is achieved at wavelengths higher than 1800 nm; an in another embodiment 100% extinction is achieved at wavelengths higher than 1500 nm. At such concentrations, visible light transmission of at least 50% is desired; and in another embodiment visible light transmission of at least 70% is desired.

Exemplary metal oxide nanoparticles that can be used as infrared absorbing particles in hardcoat compositions of the invention include, but are not limited to tin, antimony, indium and zinc oxides and doped oxides. In some embodiments, the metal oxide nanoparticles include, tin oxide, antimony oxide, indium oxide, indium doped tin oxide, antimony doped indium tin oxide, antinomy tin oxide, antimony doped tin oxide or mixtures thereof. In some embodiments, the metal oxide nanoparticles include tin oxide or doped tin oxide and optionally further includes antimony oxide and/or indium oxide. The nanoparticles can have any useful size such as, for example, 1 to 100, or 30 to 100, or 30 to 75 nanometers. In some embodiments, the metal oxide nanoparticles include antimony tin oxide or doped antimony tin oxide dispersed in a polymeric material.

In one embodiment, hardcoat compositions of the invention include a sufficient amount of infrared particles to provide an article that delivers the desired amount of infrared absorption. In one embodiment, the infrared absorbing particles are present in a range from 20 to 65 wt-%. In another embodiment, the infrared absorbing particles are present in a range from 20 to 55 wt-%.

To facilitate curing, polymerizable compositions according to the invention also include at least one initiator. Initiators useful in the invention include both free-radical thermal initiator and/or photoinitiator. Typically, an initiator and/or photoinitiator are present at less than 10 wt-%, in one embodiment less than 5 wt-%, and in another embodiment, less than 2 wt-% of the hardcoat composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.).

Useful free-radical thermal initiators include, for example, azo, peroxide, persulfate, and redox initiators, and combinations thereof.

Useful free-radical photoinitiators include, for example, those known as useful in the UV cure of acrylate polymers. Such initiators include, but are not limited to, benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850","IRGACURE 819" "IRGACURE 2005", "IRGACURE 2010", "IRGACURE 2020" and "DAROCUR 4265". Combinations of two or more photoinitiators may also be used. Further, sensitizers such as 2-isopropyl thioxanthone, commercially available from First Chemical Corporation, Pascagoula, Miss., may be used in conjunction with photoinitiator(s) such as ""IRGACURE 369".

The polymerizable coating composition for use as the surface layer or underlying hardcoat layer may also include other materials as required, such as for better coating and improved performance to meet the requirements for different application. In one embodiment, one or more hindered amine light stabilizer(s) (HALS) and/or one or more phosphonate stabilizer compound(s) may be added in the polymerizable coating composition, as described in U.S. Pat. No. 6,613,819, "Light Stable Articles" assigned to 3M Co.

The presence of one or mixed solvents can be desirable for the coating formulation, especially when metal oxide nanoparticles are present. The organic solvent used in the free radical crosslinking reaction can be any organic liquid that is inert to the reactants and product, and that will not otherwise adversely affect the reaction, but should help to make the formulation stable and the coating in high quality. Suitable organic solvents are polar, including alcohols, such as methanol, ethanol, carbitol and isopropanol, esters, such as ethyl acetate, aromatic solvents such as toluene, ethers such as diethyl ether, THF and t-butyl methyl ether, and ketones, such as acetone and methyl isobutyl ketone. Other solvent systems may also be used, such as acetonitrile, N,N-dimethylformaide and dimethyl sulfone. The amount of solvent can generally be about 20 to 90 percent by weight of the total weight of reactants and solvent.

The coating formulation can also include other inorganic particles that can optionally be incorporated in order to decrease static associated with the layer. Generally, metal oxides can be utilized to provide such properties. The metal oxides can also be surface treated with materials such as 3-methacryloxypropyltrimethoxysilane. These particles can provide constructions with antistatic properties and other desirable properties. This can be desirable to prevent static charging and resulting contamination by adhesion of dust and other unwanted debris during handling and cleaning of the film. In one such embodiment, such metal oxide particles are incorporated into the top (thin) layer of two-layer embodiments of this invention, in which the fluoroacrylate containing hardcoat is applied to a hydrocarbon-based hardcoat. At the levels at which such particles may be needed in the coating in order to confer adequate antistatic properties (typically 25 wt % and greater), these deeply colored particles can impart undesired color to the construction. However, in the thin top layer of a two-layer fluorinated hardcoat construction, their effect on the optical and transmission properties of the film can be minimized. Examples of conducting metal oxide nanoparticles useful in this embodiment include antimony double oxide available from Nissan Chemical under the trade designations Celnax CXZ-210IP and CXZ-210IP-F2. When these particles are included at appropriate levels in the coatings of this invention, the resulting fluorinated hardcoats can exhibit static charge decay times less than about 0.5 sec. In this test, the sample is placed between two electrical contacts and charged to ±5 kV. The sample is then grounded, and the time necessary for the charge to decay to 10% of its initial value is measured and recorded as the static charge decay time. In contrast, film constructions containing no conducting nanoparticles exhibit static charge decay times >30 sec.

As mentioned previously, an article of the invention can optionally include an intermediate adhesive layer 270. The intermediate adhesive layer 270 can be formed of any useful material. In some embodiments, the intermediate adhesive layer 270 can include a pressure sensitive adhesive material, as described above. In some embodiments, the intermediate adhesive layer 270 can include a curable adhesive such as, for example a thermal, UV, or moisture curable adhesive. The intermediate adhesive layer 270 can have any useful thickness such as, for example, 1 to 100 micrometers, or 5 to 50 micrometers, or 10 to 50 micrometers, or 10 to 30 micrometers.

The optional intermediate polymeric layer 260 can be formed of any useful material. In some embodiments, the intermediate polymeric layer 260 can include a polyolefin, polyacrylate, polyester, polycarbonate, fluoropolymer, and the like. In one embodiment, the intermediate polymeric layer 260 can include a polyethylene terephthalate. The intermediate polymeric layer 260 can have any useful thickness such as, for example, 5 to 500 micrometers, or 10 to 100 micrometers, or 25 to 75 micrometers, or 25 to 50 micrometers.

An article of the invention can also include a tear resistant film (not shown). In many embodiments, the tear resistant film includes alternating layers of stiff polymer and a ductile polymer. In some embodiments, the tear resistant film 160 includes alternating layers of stiff polyester or copolyester and a ductile sebacic acid based copolyester. In many embodiments, the stiff polyester or copolyester layers are oriented in at least one direction and, or are biaxially oriented. Examples of these tear resistant films are described in U.S. Pat. Nos. 6,040,061; 5,427,842; and 5,604,019 which are incorporated by reference herein to the extent they do not conflict with the present disclosure.

In another embodiment, the tear resistant film is a single monolithic polymeric film that provides a desired level of tear resistance. Such films are known in the art as "tough" polymeric film. Toughness can be described as a measure of the energy a polymer can absorb before it breaks, and examples of tough polymers include ABS (poly (acrylonitrile butadiene styrene)), LDPE (linear low density polyethylene), HIPS (high impact polystryrene), polyurethanes and the like. Additionally, increasing the thickness of the monolithic polymeric film may permit the usage of some polymers, such as PET and nylon, to be utilized as a tear resistant film.

By "tear resistant" it is broadly meant that a multilayer film according to this disclosure demonstrates a Graves area in one direction of the film which exceeds the Graves area in the same direction for a single layer film comprising only the stiff polymer of the multilayer film, the single layer film being processed in the same manner as and to substantially the same thickness as the multilayer film. In many embodiments, the tear resistant solar control films demonstrate a Graves area in one direction of the film equal to at least about 40+0.4(x) kpsi % wherein x is the nominal thickness of the film in micrometers. More specifically, Graves area is obtained by mathematically integrating the area beneath the curve in a graphical plot of the stress (as measured in kpsi) experienced by the film versus the strain (as measured by Graves elongation in % which is defined more fully below) that the film undergoes during a test in which a film sample specifically shaped for the Graves area test is clamped between opposed jaws that are moved apart at a constant rate to concentrate the tearing stresses in a small area. Thus, Graves area is a combined measure of the film's tensile modulus (i.e., the film's stiffness and dimensional stability) and the ability of the film to resist advancing a tear. Consequently, Graves area may be regarded as a measure of the total energy required to cause the film to fail; that is, the ability of the film to absorb energy. In many embodiments, the tear resistant solar control films desirably exhibit a Graves elongation at break of at least 20%, or at least 40% during the Graves area test. The tear resistance solar control films may be measured by ASTM Test Method D 1004 (also known as a Graves tear test).

In addition, many multilayer or monolithic tear resistant films according to this disclosure demonstrate a tensile modulus (as measured in a conventional tensile test) of at least 175 kpsi (1,208 MPa), or at least 240 kpsi (1,656 MPa), or at least 450 kpsi (3,105 MPa) in at least one direction of the film.

Both the thickness of the tear resistant multilayer film and the individual layers which comprise the tear resistant multilayer film may vary over wide limits. These films can have a nominal thickness of from about 7 to 500 micrometers, or from about 15 to 185 micrometers. The individual layers of stiff polyester or copolyester can have an average nominal thickness of at least about 0.5 micrometers, or from greater than 0.5 to 75 micrometers, or from about 1 to 25 micrometers. In some embodiments, the ductile sebacic acid based copolyester layers are thinner than the stiff polyester/copolyester layers. The ductile material layers may range in average nominal thickness from greater than about 0.01 micrometer to less than about 5 micrometers, or from about 0.2 to 3 micrometer. Similarly, the exact order of the individual layers is not critical. The total number of layers may also vary substantially. In many embodiments, the tear resistant multilayer film includes at least 3 layers, or from 5 to 35 layers, or from 10 to 15 layers.

Experimental

A. Materials

Unless otherwise noted, as used in the examples, "HFPO—" refers to the end group $F(CF(CF_3)CF_2O)_xCF(CF_3)$— of the methyl ester $F(CF(CF_3)CF_2O)xCF(CF_3)C(O)OCH_3$, can be prepared according to the method reported in U.S. Pat. No. 3,250,808 (Moore et al.), the disclosure of which is incorporated herein by reference, with purification by fractional distillation. "—HFPO—" refers to $CH_3(O)CCF(CF_3)(OCF_2CF(CF_3))_{x1}OCF_2CF_2CF_2CF_2O(CF(CF_3)CF_2O)_{x2}CF(CF_3COOCH_3$ ($CH_3O(O)C$—HFPO—$C(O)OCH_3$) prepared from the oligomerization of $FC(O)CF_2CF_2C(O)F$ with hexafluoropropeneoxide in the presence of KF or CsF as an initiator according to the method reported in U.S. Pat. No. 3,250,807 (Fritz, et al.) which provides the HFPO oligomer bis-acid fluoride, followed by methanolysis and purification by removal of lower boiling materials by fractional distillation as described in U.S. Pat. No. 6,923,921 (Flynn, et. al.). The disclosure of both aforementioned patents are incorporated herein by reference.

HFPO—OH, HFPO—$C(O)NHCH_2CH_2OH$, prepared in according to published patent, described in paragraph [0058], US 20060148350 from HFPO—$C(O)OCH_3$ and $NH_2CH_2CH_2OH$. The average molecule weight is about 1344. HFPO-Diol, $HOCH_2CH_2NHC(O)$—HFPO—$C(O)NHCH_2CH_2OH$, prepared in according to filed patent, Preparation No. 27 of U.S. patent application Ser. No. 11/277,162, filed on Mar. 22, 2006 entitled "PERFLUOROPOLYETHER URETHANE ADDITIVES HAVING (METH)ACRYL GROUPS AND HARD COATS", from $CH_3O(O)C$—HFPO—$C(O)OCH_3$ and $NH_2CH_2CH_2OH$. A 200 ml round bottom flask equipped with magnetic stir bar was charged with 3.81 g (0.0624 mol) ethanolamine and heated to 75 degrees Celsius under a dry air. A charge of 30.0 g (0.240 mol, 1250 MW) $CH_3O(O)C$—HFPO—$C(O)OCH_3$ was added via a pressure equalizing funnel over 40 min and the reaction was allowed to heat for about 18 h. From Fourier Transform Infrared Spectroscopy (FTIR) analysis, the amide —C(O)NH— was formed as the ester signal (—$CO_2$—) disappeared. Next 50.7 g of methyl t-butyl ether was added to the reaction to provide a solution that was washed successively with 20 ml of 2N aqueous HCl, and then 3 times with 20 ml of water, The solution was then dried over anhydrous magnesium sulfate, filtered and concentrated on a rotary evaporator at aspirator pressure in a 75 degrees Celsius water bath to provide the product as a thick syrup. The average molecule weight is about 1308.

N100, Polyisocyanate Desmodur™ (Des) N100, was obtained from Bayer Polymers LLC, of Pittsburgh, Pa.

N3300, Polyisocyanate Desmodur™ 3300, was obtained from Bayer Polymers LLC, of Pittsburgh, Pa.

SR444C, Pentaerythritol triacrylate ("PET3A"), under the trade designation "SR444C", was obtained from Sartomer Company of Exton, Pa.

SR351, Trimethylolpropane triacrylate ("TMPTA"), under the trade designation "SR3551", was obtained from Sartomer Company of Exton, Pa.

$NH_2Si$, $H_2NCH_2CH_2CH_2Si(OCH_3)_3$ is available from Sigma Aldrich of Milwaukee, Wis.

D-1173, Darocur™ 1173 which refers to 2-hydroxy-2-methyl-1-phenyl-propan-1-one=photo-cleavage initiator, and is manufactured by Ciba Specialty Chemicals.

I-184, the UV photoinitiator, 1-hydroxycyclohexyl phenyl ketone used was obtained from Ciba Specialty Products, Tarrytown, N.Y. and sold under the trade designation "Irgacure 184."

I-907, the photoinitiator 2-methyl-1-[4-(methylthio)phenyl]-2-morpholinopropan-1-one used was obtained from Ciba Specialty Products, Tarrytown, N.Y. and sold under the trade designation "Irgacure 907."

Methyl perfluorobutyl ether (HFE 7100 or 4O1) was obtained from 3M Company, St. Paul, Minn.

DBTDL, Dibutyltin dilaurate was obtained from Sigma Aldrich of Milwaukee, Wis.

Unless otherwise noted, "MW" refers to molecular weight and "EW" refers to equivalent weight. Further, "° C." may be used interchangeably with "degrees Celsius" and "mol" refers to moles of a particular material and "eq" refers to equivalents of a particular material. Further, "Me" constitutes a methyl group and may be used interchangeably with "$CH_3$."

ATO-1, refers to an antimony tin oxide (ATO) coating formulation that includes 62.5% ATO (from Inframat Corporation), 15% HDDA (1,6-hexane diol diacrylate, SR238 from Sartomer), 15% PETA (Pentaerythritol triacrylate, PETA-K from UCB-Radcure), and 7.5% polymeric dispersant (Solplus D510 from Noveon Inc., Cleveland Ohio.). The dispersion was milled for 8 hours using Netzsch LME-1 Disk Mill with MoliNEX™ eccentric disks and one liter stainless steel chamber (Netzsch Incorporated, Exton Pa.). The final particle size was ~60 nm (PDI=0.21) measured by Zetasizer Nano ZS (Malvern Instruments Ltd, Worcestershire, United Kingdom). ATO-1 was then made by making a 45% solution of the formulation in 1-methoxy2-propanol. The solution was diluted to 30% formulation with methyl isobutyl ketone, and 2% Darocur™ 1173 (Ciba Specialty Chemicals, Tarrytown N.Y.) photo initiator was added.

ATO-2, refers to an ATO coating formulation included 80 g TRB Paste 6070 (purchased from Advanced Nano Products, S. Korea); and 20 g ATO premix formulation that includes: 24.58% HDDA, 1.59% Tinuvin 123, 1.11% Irgacure 819, 1.11% Irgacure 184, 0.26% FA-1, and 71.36% MEK.

Solvent isopropane alcohol (IPA), methyl ethyl ketone (MEK), toluene, methyl isobutyl ketone (MIBK), acetone, ethyl acetate (EtOAc) and N,N-dimethylformamide (DMF) are available from Aldrich;

MeFBSEA, $C_4F_9SO_2NMeC_2H_4OC(O)CH=CH_2$, prepared according to the procedure described in Example 2-B, WO 01/130973, available from 3M Co.

B. Preparation of Additives

Preparation of FA-1, HFPO—OH/N100/SR-444C (15/100/88.5)

A 500 ml round bottom 2-necked flask equipped with magnetic stir bar was charged with 25.00 g (0.131 eq, 191 EW) Des N100, 26.39 g (0.0196 eq, 1344 EW) $F(CF(CF_3)CF_2O)_{6.85}CF(CF_3)C(O)NHCH_2CH_2OH$, and 109.62 g MEK, and was swirled to produce a homogeneous solution. The flask was placed in an 80 degrees Celsius bath, charged with 2 drops of dibutyltin dilaurate catalyst, and fitted with a condenser. The reaction was cloudy at first, but cleared within two minutes. At about 1.75 hours, the flask was removed from the bath and 2.42 g of MEK was added to compensate for lost solvent. A 2.0 g sample was removed from the flask, leaving (1-(2.0/161.01) or 0.9876 weight fraction, of the reaction, and 57.51 g (98.76% of 58.23 g) (0.116 mol, 494.3 equivalent weight) SR-444C was added to the reaction, which was placed in a 63 degrees Celsius bath. At about 5.25 hours FTIR showed no isocyanate absorption at 2273 $cm^{-1}$, and 0.56 g MEK was added to compensate for solvent lost to bring the material to 50% solids. The product has a calculated wt % F of 15.6% F.

Preparation of FA-2, HFPO—OH/N100/SR-444C/NH$_2$Si (5/30/20/5)

A 500 ml round bottom flask equipped with a stir bar was charged with 5.73 g (30 meq) Des N100, 37 g MEK, 15 g $C_4F_9OCH_3$, 2 drops of DBTDL, 6.15 g (5 meq) HFPO—C(O)NHCH$_2$CH$_2$OH (1229 equivalent molecule weight), and 0.05 g BHT, and placed in a 60 degrees Celsius oil bath. After 1 hour, 0.98 g (5 meq) $H_2N(CH_2)_3Si(OCH_3)_3$ was added, followed in 10 minutes by the addition of 4.46 g (20 meq, 494.3 equivalent weight) SR444C. The reaction mixture showed no residual isocyanate by FTIR after a total reaction time of 5.75 hours at 25% solution.

Preparation of FA-3, HFPO—OH/N100/SR-444C (15/100/85)

A 500 ml round bottom flask equipped with magnetic stir bar was charged with 25.0 g (100 mole percent) (0.131 eq, 191 EW) Des N100, 55.5 g (85 mole percent) (0.087 eq, 494.3 EW) of Sartomer SR444C, 11.5 mg (15 mole percent) of MEHQ, and 126.77 g methyl ethyl ketone (MEK). The reaction was swirled to dissolve all the reactants, the flask was placed in an oil bath at 60 degrees Celsius, and fitted with a condenser under dry air. Two drops of dibutyltin dilaurate was added to the reaction. After 1 hour, 58.64 g (0.0436 eq, 1344 EW) $F(CF(CF_3)CF_2O)_{6.85}CF(CF_3)C(O)NHCH_2CH_2OH$ was added to the reaction via addition funnel over about 75 minutes. The reaction was monitored by FTIR and showed a small isocyanate absorption at 2273 $cm^{-1}$ after about 5 hours of reaction, but no isocyanate absorption at 7.5 hours of reaction. The material was used as a 50% solids solution in MEK.

Preparation of FA-4, HFPO-Diol/N3300/SR-444C (5/30/20)

A 240 ml bottle was charged with 5.79 g Des N3300 (EW about 193, about 30 milliequivalents NCO), 3.35 g HFPO-Diol (MW about 1341, 10 meq OH), 9.89 g SR-444C (EW about 494.3, about 20 milliequivalents OH), 5 drops of dibutyltin dilaurate catalyst and 52 g MEK (about 30% solid) under nitrogen. The solution was reacted at 70 degrees Celsius in an oil bath with a magnetic stir bar for 10 hours after sealing the bottle. There was a small amount of precipitate formed upon standing at room temperature. FTIR analysis showed no unreacted-NCO signal.

FA-5, an approximately 1:1 molar ratio adduct of HFPO—C(O)NHCH$_2$CH$_2$CH$_2$NHCH$_3$ and TMPTA was prepared according to the procedure described in paragraph [0110], U.S. Pat. No. 7,101,618.

Preparation of FC-6, HFPO—C(O)N(H)CH$_2$CH(OC(O)CH=CH$_2$)CH$_2$OC(O)CH=CH$_2$

FA-6 was prepared according to the procedure described in Prep. No.# 25 in U.S. patent application Ser. No. 11/277162, filed on Mar. 22, 2006 entitled "PERFLUOROPOLYETHER URETHANE ADDITIVES HAVING (METH)ACRYL GROUPS AND HARD COATS" from HFPO—C(O)NHCH$_2$CH(OH)CH$_2$OH and CH$_2$=CHC(O)Cl. HFPO—C(O)NHCH$_2$CH(OH)CH$_2$OH was prepared according to Preparation No. 6 or paragraph [0066], of U.S. Patent Pub. No. 2005/0249956.

To a 250 ml 3 necked round bottom flask equipped with overhead stirrer was charged 63.5 g (0.05 mol) of HFPO—C(O)NHCH$_2$CH(OH)CH$_2$OH, 9.56 g (0.946 mol) triethylamine and 100 g ethyl acetate. To the flask at room temperature was added 11.26 g (0.0945 mol) acryloyl chloride using a pressure-equalizing dropping funnel over 12 min, with the reaction temperature rising from 25 to a maximum of 40 degree C. The dropping funnel was rinsed with 5 g additional ethyl acetate that was added to the reaction that was then placed in a 40 degree C. bath and allowed to react for 2 hours and 10 min additional time. The organic layer was then successively washed with 65 g 2% aqueous sulfuric acid, 65 g 2% aqueous sodium bicarbonate, and 65 g water, dried over anhydrous magnesium sulfate, filtered, treated with 16 mg methoxyhydroquinone (MEHQ), and concentrated on a rotary evaporator at 45 degree C. to yield 62.8 g of crude product. Next 35 g of this material was chromatographed on 600 ml of silica gel (SX0143U-3, Grade 62, 60-200 mesh, EM Science) using 25:75 ethyl acetate: heptane as an eluent. The first two fractions were 250 ml in volume, the remaining fractions were 125 ml in volume. Fractions 4-10 were combined, 8 mg MEHQ was added to the fractions, which were concentrated on a rotary evaporator at 55 degree C. to provide product that had a calculated wt-% fluorine of 58.5%

Preparation of FA-7, (ArO)CH$_2$CH(OAr)CH$_2$NHC(O)—HFPO—C(O)NHCH$_2$CH(OAr)CH$_2$OAr (ArO)CH$_2$CH(OAr)CH$_2$NHC(O)—HFPO—C(O)NHCH$_2$CH(OAr)CH$_2$OAr was prepared from CH$_3$OC(O)—HFPO—C(O)OCH$_3$ to (HO)CH$_2$CH(OH)CH$_2$NHC(O)—HFPO—C(O)NHCH$_2$CH(OH)CH$_2$OH by the reaction with NH$_2$CH$_2$CH(OH)CH$_2$OH, followed by reaction with CH$_2$=CHCO$_2$Cl, according to the procedure described in Prep. No.# 26, of U.S. patent application Ser. No. 11/277162, filed on Mar. 22, 2006, the disclosure of which is incorporated herein by reference in the preparation of HFPO—C(O)NHCH$_2$CH(OAr)CH$_2$OAr from HFPO—C(O)OCH$_3$ when CH$_3$O(O)C—HFPO—C(O)OCH$_3$ was used in replacement of HFPO—C(O)OCH$_3$ in the reaction with NH$_2$CH$_2$CH(OH)CH$_2$OH, followed by reaction with CH$_2$=CHCOCl.

Preparation of FA-8, Monofunctional Perfluoropolyether Methacrylate, HFPO—C(O)N(H)CH$_2$CH$_2$OC(O)C(CH$_3$)=CH$_2$ This compound is made by a procedure similar to that described in U.S. Publication No. 2004/0077775, entitled "Fluorochemical Composition Comprising a Fluorinated Polymer and Treatment of a Fibrous Substrate Therewith," filed on May 24, 2002, for Synthesis of (HFPO)k-methacrylate, substituting F(CF(CF$_3$)CF$_2$O)$_x$CF(CF$_3$)C(O)NHCH$_2$CH$_2$OH with x=6.8, molecular weight 1344, for the F(CF(CF$_3$)CF$_2$O)$_x$CF(CF$_3$)C(O)NHCH$_2$CH$_2$OH with x=10.5

Preparation of FA-9 MeFBSE-MDI-HEA (also referred to as C4MH)

C$_4$F$_9$SO$_2$N(CH$_3$)C$_2$H$_4$O—CONHC$_6$H$_5$CH$_2$C$_6$H$_5$NHCO—OC$_2$H$_4$OCOH=CH$_2$ (MeFBSE-MDI-HEA) was prepared according to the procedure described in U.S. Patent Application Publication No. 2005/0143541, paragraph 0104.

C. Test Methods

Method for Determining Contact Angle:

The coatings were rinsed for 1 minute by hand agitation in IPA before being subjected to measurement of water and hexadecane contact angles. Measurements were made using as-received reagent-grade hexadecane "oil" (Aldrich) and deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops. Drop volumes were 5 μL for static measurements and 1-3 μL for advancing and receding. For hexadecane, only advancing and receding contact angles are reported because static and advancing values were found to be nearly equal.

Method for Determining Marker Repellency:

For this test one of the Sharpie Permanent Marker, Vis-à-vis Permanent Overhead Project Pen or King Size Permanent Marker (all commercially available from Sanford, USA) were used as the marker. First, the tip of the selected marker was cut with a razor blade to provide a wide flat marking tip. Then, using the marker and an edge of a straight ruler as a guide, a straight line was drawn over the sample coatings applied over a PET substrate at an approximate speed of 15 cm per second. The appearance of the straigt line drawn on the coatings was viewed and a number was assigned to reflect the degree of repellency of the sample coating towards markers. An assigned number of 1 indicates excellent repellency while an assigned number of 5 indicates poor repellency. Depending on the type of marker used, the results are reported as Sharpie test, Vis-à-vis test or King marker test. Method for Determining Solvent Resistance: For this test, a drop (about 1.25 cm in diameter) of methyl ethyl ketone (MEK) or other organic solvent was placed on a sample coating applied over a PET substrate, and was allowed to dry at room temperature. Afterwards, the sample coating was visually observed for appearance and rated either as Haze (H), indicating poor solvent repellency or Clear (C), indicating good solvent repellency. Furthermore, using the above "method for marker test", the sharpie test was repeated on the spot where a drop of MEK or organic solvent repellency test was conducted, and a marker repellency number ranging from 1 to 5 was assigned.

Steel Wool Testing:

The abrasion resistance of the cured films was tested crossweb to the coating direction by use of a mechanical device capable of oscillating cheesecloth or steel wool fastened to a stylus (by means of a rubber gasket) across the film's surface. The stylus oscillated over a 10 cm wide sweep width at a rate of 3.5 wipes/second wherein a "wipe" is defined as a single travel of 10 cm. The stylus had a flat, cylindrical geometry with a diameter of 1.25 inch (3.2 cm). The device was equipped with a platform on which weights were placed to increase the force exerted by the stylus normal to the film's surface. The cheesecloth was obtained from Summers Optical, EMS Packaging, a subdivision of EMS Acquisition Corp., Hatsfield, Pa. under the trade designation "Mil Spec CCC-c-440 Product # S12905". The cheesecloth was folded into 12 layers. The steel wool was obtained from Rhodes-American, a division of Homax Products, Bellingham, Wash. under the trade designation "#0000-Super-Fine" and was used as received. A single sample was tested for each example, with the weight in grams applied to the stylus and the number of wipes employed during testing reported. No visible scratching is reported in the Tables as "NS".

D. Preparation of hardcoat compositions and the resulting hardcoat layers

Hardcoat compositions were prepared in weight % ratio as generally described in the following tables. The coating on solar control multilayer film was at a dry thickness of about 4 microns using a wire wound rod. The coating were dried in a 110 degree Celsius oven for about 1 to 2 minutes and then placed on a conveyor belt coupled to an ultraviolet (UV) light curing device and UV cured using a Fusion 500 watt H bulb (500 W) at 20 feet/minute. The coatings were then analyzed using the above described test methods.

1. Urethane Containing HFPO multiacrylates as Additive in ATO Hardcoat Compositions 1~2% D-1173 (10% solution in MEK) was added to the 30% ATO-1 nano-particle hardcoat dispersion, diluted with MEK. Fluoro-acrylate-additives, FA-1, FA-2, FA-3 and FA-4 were prepared as discussed above, are diluted with MEK, EtOAc or MEK/mixed solvents to 30% solution, than added to ATO solution in different ratios. The 30% solution was coated on solar control multilayer films with No. #10 wire rod. The coated films were dried in 110° C. oven for ~2 minutes, then UV-cured under N$_2$ with H-bulb at 20 feet/minutes. The detailed coating formulations and coating quality were recorded in Table I. Control-1 is pure ATO-1 formulation without any fluoro-acrylate-additive (0% FA). Control-2 is the formulation of ATO-2 with 0.06% FA-1 additive, and the formulation was coated using an extrusion die coating process and cured using Fusion H and D bulbs (at 60% power) at 50 feet per minute to obtain a dry coating of approximately 2.6 microns thick. Following the hardcoat coating process, a pressure sensitive adhesive (PSA) coating was applied to the surface opposite the hardcoat surface and a silicone release liner was laminated thereto. The PSA coating was applied at approximately 0.8 g/ft$^2$ dry coating weight.

TABLE I

ATO Hardcoat Formulation with Perfluoropolyether Additive

| Exp. No# | ATO | FA | FA % | Coating Quality |
|---|---|---|---|---|
| Control-1 | ATO-1 | None | 0 | Good |
| Control-2 | ATO-2 | FA-1 | 0.06 | Good |
| 1 | ATO-1 | FA-1 | 0.1 | Good |
| 2 | ATO-1 | FA-1 | 0.25 | Good |
| 3 | ATO-1 | FA-1 | 0.5 | Good |

TABLE I-continued

ATO Hardcoat Formulation with Perfluoropolyether Additive

| Exp. No# | ATO | FA | FA % | Coating Quality |
|---|---|---|---|---|
| 4 | ATO-1 | FA-1 | 1.0 | Good |
| 5 | ATO-1 | FA-1 | 2.0 | Good |
| 6 | ATO-1 | FA-2 | 0.5 | Good |
| 7 | ATO-1 | FA-3 | 0.5 | Good |
| 8 | ATO-1 | FA-4 | 0.5 | Good |

The marker repellent and contact angle were measured as discussed above and the results from the formulations of Table I are summarized in Table II.

TABLE II

Marker Repellent and Contact Angle Data with Perfluoropolyether Additive

| Exp. No# | Sharpie Test | King Size Test | Vis-à-vis Test | $H_2O$ Contact Angle Adv/Rec/Static (°) | Oil Contact Angle Adv/Rec/Static (°) |
|---|---|---|---|---|---|
| Control-1 | 5 | 5 | 5 | 79/45/71 | 10/5/13 |
| Control-2 | 3 | 5 | 3 | 110/53/99 | 55/43/54 |
| 1 | 1 | 1 | 1 | 103/75/100 | 60/50/57 |
| 2 | 1 | 1 | 1 | 106/82/102 | 68/60/63 |
| 3 | 1 | 1 | 1 | 110/88/109 | 72/64/67 |
| 4 | 1 | 1 | 1 | 124/99/120 | 74/63/68 |
| 5 | 1 | 1 | 1 | 115/88/111 | 70/63/66 |
| 6 | 1 | 1 | 1 | 116/88/110 | 69/61/67 |
| 7 | 1 | 1 | 1 | 115/90/107 | 68/62/66 |
| 8 | 2 | 1 | 2 | 100/73/94 | 55/45/52 |

From the above results it can be seen that, 0.25~1% of FA-1 provides desirable results with respect to repellency for easy cleaning performance The solvent resistance and corresponding sharpie marker tests were performed as discussed above and the results are recorded in Table III.

TABLE III

Solvent Resistance with Perfluoropolyether Additive on PET

| Exp, No# | IPA | Toluene | MIBK | Acetone | EtOAc | MEK | DMF |
|---|---|---|---|---|---|---|---|
| 1 | C/1 | C/1 | C/1 | C/1 | C/1 | C/1 | C/1 |
| 2 | C/1 | C/1 | C/1 | C/1 | C/1 | C/1 | C/1 |
| 3 | C/1 | C/1 | C/1 | C/1 | C/1 | C/1 | C/1 |
| 4 | C/1 | C/1 | C/1 | C/1 | C/1 | C/1 | C/1 |
| 5 | C/1 | C/1 | C/1 | C/1 | C/1 | C/1 | C/1 |

TABLE III-continued

Solvent Resistance with Perfluoropolyether Additive on PET

| Exp, No# | IPA | Toluene | MIBK | Acetone | EtOAc | MEK | DMF |
|---|---|---|---|---|---|---|---|
| 6 | C/1 | C/1 | C/1 | C/1 | C/1 | C/1 | C/1 |
| 7 | C/1 | C/1 | C/1 | C/1 | C/1 | C/1 | C/1 |
| 8 | C/1 | C/1 | C/1 | C/1 | C/1 | C/1 | C/1 |
| Connol-1 | C/5 | C/5 | C/5 | C/5 | C/5 | C/5 | C/5 |
| Control-2 | C/3 | C/3 | C/3 | C/3 | C/3 | C/3 | C/3 |

All of the hardcoats showed excellent solvent resistance, and no appearance change was observed with selected solvents, which indicated that the coating was tolerant to cleaning with solvent-born cleaning formulations. All the sharpie marker repellency also remained after the solvent test.

These improvements in solvent resistance, marker repellency, and mechanical durability that are exhibited by at least some embodiments of the invention may be due at least art by the degree of crosslinking degree in the hardcoat layers that are formed from compositions of the invention. Generally, such a degree of crosslinking is unattainable from non-UV cured polymerization processes. It has also been suggested that both high water/oil contact angles and good solvent resistance may help in achieving high marker repellency characteristics.

The durability testing was performed as discussed above and the results are shown in Table IV below.

TABLE IV

Steel Wool Test Results and Refractive Index Measurement*

| Exp. No# | Before steel wool Ink repellence | Ink repellence | Coating Appearance | $H_2O$ Contact Angle Adv/Rec/Static | Oil Contact Angle Adv/Rec/Static |
|---|---|---|---|---|---|
| Control-2 | Y | No | NS | 66/15/65 | 27/13/25 |
| 1a** | Y | Y | NS | 116/98/110 | 70/63/69 |
| 2 | Y | Y | NS | 111/78/98 | 67/55/64 |
| 3 | Y | Y | NS | 118/80/112 | 49/34/46 |
| 3a** | Y | Y | NS | 108/97/105 | 50/44/47 |
| 4 | Y | Y | NS | 115/82/110 | 69/52/65 |
| 5 | Y | Y | NS | 119/86/111 | 68/46/62 |

*Steel wool test by 1.25 inch stylus, 500 g weight and 300 rubs;
**Coated with No. 30 wire rod.

2. Urethane Containing HFPO multiacrylates as Additive in ATO Hardcoat Compositions Contact angles of water and hexadecane were tested for hardcoat compositions that included fluoro-acrylate-non-urethane additives. The particular formulations and results of testign can be seen in Tables V, VI, VII and VIII below.

Generally, the additive (FA-5, FA-6, FA-7, and FA-8) was diluted in MEK to give a 10wt-% solution. The ATO was diluted with Carbitol to make a 30% solution that included 1wt-% D-1173 (photo initiator). The additive solution and the ATO solution were then combined in the ratios given in the respective Tables below. Contact angles and marker repellency testing was then carried out and the results are presented below.

TABLE V (HFPO)$x$—CONHC$_3$H$_6$NHCH$_3$/TMPTA additive (FA-5) to ATO hardcoat:

| Exp. No# | Formulation (Ratio by weight) | Coating Quality | H$_2$O Adv | H$_2$O Rec | H$_2$O Static | HD Adv | HD Rec | HD Static | Marker Test King | Marker Test Vis a Vis | Marker Test Sharpie |
|---|---|---|---|---|---|---|---|---|---|---|---|
| 9 | ATO/FA-5 (99.75/0.25) | Good | 114 | 95 | 107 | 64 | 57 | 63 | 1 | 1 | 1 |
|  |  |  | 113 | 88 | 106 | 72 | 59 | 63 |  |  |  |
|  |  |  | 110 | 87 | 106 | 70 | 60 | 69 |  |  |  |
|  | Average |  | 112.3 | 90.0 | 106.3 | 68.7 | 58.7 | 65.0 |  |  |  |
| 10 | ATO/FA-5 (99.5/0.5) | OK (small beads) | 114 | 93 | 105 | 73 | 53 | 70 | 1 | 1 | 1 |
|  |  |  | 116 | 93 | 108 | 72 | 52 | 70 |  |  |  |
|  | Average |  | 115 | 93 | 106.5 | 72.5 | 52.5 | 70 |  |  |  |
| 11 | ATO/FA-5 (99.0/1.0) | some dewet | 113 | 88 | 109 | 73 | 64 | 73 | 1 | 1 | 1 |
|  |  |  | 114 | 94 | 110 | 73 | 63 | 73 |  |  |  |
|  |  |  | 112 | 93 | 108 |  |  |  |  |  |  |
|  | Average |  | 113.0 | 91.7 | 109.0 | 73.0 | 63.5 | 73.0 |  |  |  |

TABLE VI (HFPO)$x$—CONHCH$_2$CH(OAr)CH$_2$OAr (FA-6) Additive to ATO hardcoat:

| Exp. No# | Formulation (Ratio by weight) | Coating Quality | H$_2$O Adv | H$_2$O Rec | H$_2$O Static | HD Adv | HD Rec | HD Static | Marker Test King | Marker Test Vis a Vis | Marker Test Sharpie |
|---|---|---|---|---|---|---|---|---|---|---|---|
| 12 | ATO/FA-6 (99.75/0.25) | OK | 119 | 106 | 110 | 73 | 67 | 72 | 1 | 1 | 1 |
|  |  |  | 115 | 105 | 110 | 69 | 65 | 72 |  |  |  |
|  |  |  | 117 | 104 | 112 | 73 | 64 | 72 |  |  |  |
|  | Average |  | 117.0 | 105.0 | 110.7 | 71.7 | 65.3 | 72.0 |  |  |  |
| 13 | ATO/FA-6 (99.5/0.5) | OK | 119 | 102 | 111 | 72 | 63 | 71 | 1 | 1 | 1 |
|  |  |  | 118 | 103 | 113 | 72 | 63 | 71 |  |  |  |
|  | Average |  | 119 | 102.5 | 112 | 72 | 63 | 71 |  |  |  |
| 14 | ATO/FA-6 (99.0/1.0) | Good | 121 | 102 | 114 | 72 | 65 | 71 | 1 | 2 | 1 |
|  |  |  | 117 | 100 | 112 | 72 | 65 | 72 |  |  |  |
|  |  |  | 120 | 102 | 113 |  |  |  |  |  |  |
|  | Average |  | 119.3 | 101.3 | 113.0 | 72.0 | 65.0 | 71.5 |  |  |  |

TABLE VII (ArO)CH$_2$CH(OAr)CH$_2$NHC(O)—HFPO—C(O)NHCH$_2$CH(OAr)CH$_2$OAr
(FA-7, 10% in MEK) Additive to ATO hardcoat:

| Exp. No# | Coating Formulation | Quality | H$_2$O Adv | H$_2$O Rec | H$_2$O Static | HD Adv | HD Rec | HD Static | Marker Test King | Marker Test Vis a Vis | Marker Test Sharpie |
|---|---|---|---|---|---|---|---|---|---|---|---|
| 15 | ATO/FA-7 (99.75/0.25) | Good | 113 | 95 | 107 | 68 | 57 | 68 | 1 | 2 | 1 |
|  |  |  | 112 | 94 | 106 | 67 | 55 | 69 |  |  |  |
|  | Average |  | 112.5 | 94.5 | 106.5 | 67.5 | 56 | 68.5 |  |  |  |
| 16 | ATO/FA-7 (99.5/0.5) | Good | 112 | 98 | 108 | 70 | 55 | 67 | 1 | 2 | 1 |
|  |  |  | 112 | 97 | 109 | 70 | 56 | 69 |  |  |  |
|  | Average |  | 112 | 97.5 | 108.5 | 70 | 55.5 | 68 |  |  |  |
| 17 | ATO/FA-7 (99.0/1.0) | Good | 114 | 96 | 107 | 71 | 60 | 69 | 1 | 1 | 1 |
|  |  |  | 114 | 97 | 107 | 71 | 60 | 69 |  |  |  |
|  | Average |  | 114 | 96.5 | 107 | 71 | 60 | 69 |  |  |  |

TABLE VIII (HFPO)$x$—CONHC$_2$H$_4$OC(O)CMe=CH$_2$ (FA-8) Additive to ATO hardcoat:

| Exp. No# | Formulation (Ratio by weight) | Coating Quality | H$_2$O Adv | H$_2$O Rec | H$_2$O Static | HD Adv | HD Rec | HD Static | Marker Test King | Marker Test Vis a Vis | Marker Test Sharpie |
|---|---|---|---|---|---|---|---|---|---|---|---|
| 18 | ATO/FA-8 (99.75/0.25) | some dewet | 99 | 77 | 95 | 46 | 33 | 43 | 2 | 2 | 2 |
|  |  |  | 99 | 77 | 95 | 48 | 35 | 45 |  |  |  |
|  | Average |  | 99 | 77 | 95 | 47 | 34 | 44 |  |  |  |
| 19 | ATO/FA-8/ MeFBSEA (99.75/0.25/5) | OK | 102 | 80 | 99 | 65 | 45 | 57 | 1 | 2 | 2 |
|  |  |  | 100 | 78 | 97 | 65 | 44 | 58 |  |  |  |
|  |  |  | 101 | 79 | 98 | 65 | 44.5 | 57.5 |  |  |  |

TABLE VIII-continued (HFPO)x—CONHC$_2$H$_4$OC(O)CMe=CH$_2$ (FA-8) Additive to ATO hardcoat:

| Exp. No# | Formulation (Ratio by weight) | Coating Quality | H$_2$O Adv | H$_2$O Rec | H$_2$O Static | HD Adv | HD Rec | HD Static | Marker Test King | Marker Test Vis a Vis | Marker Test Sharpie |
|---|---|---|---|---|---|---|---|---|---|---|---|
| 20 | ATO/FA-8 (99.5/0.5) | Good | 102 | 83 | 95 | 55 | 43 | 50 | 1 | 2 | 1 |
|  |  |  | 103 | 81 | 93 | 55 | 42 | 51 |  |  |  |
|  | Average |  | 103 | 82 | 94 | 55 | 42.5 | 50.5 |  |  |  |
| 21 | ATO/FA-8 (99.0/1.0) | Good | 110 | 92 | 103 | 70 | 57 | 70 | 1 | 1 | 1 |
|  |  |  | 111 | 92 | 105 | 69 | 58 | 68 |  |  |  |
|  | Average |  | 111 | 92 | 104 | 70 | 57.5 | 69 |  |  |  |

As seen in Tables V, VI, VII and VIII, all of the fluoro-acrylate-non-urethane additives that were tested produced hardcoat layers with desirable properties, such as solvent resistance to acetone, toluene, IPA, MIBK, EtOAc and DMF, and good durability to Steel Wood abrasive test.

3. MeFBSE-MDI-HEA (FA-9) as Additive for UV Curable ATO Hardcoat:

An ATO-1 nano-particle hardcoat was combined with 1% D-1173 photo-initiator (10% solution in MEK), and then diluted with MEK to a 20% solution. Fluoro-acrylate-additives were added along with a hydrosilylation catalyst, platinum-divinyltetamethydisiloxane complex (CAS# 68478-92-2), at 0.015% by weight, and then diluted with heptane to a 10% solution. The ~20% solution of ATO/Additive was formulated in different ratio by weight (based on Table V below), and coated on PET film with a No. #10 wire rod. The coated films were dried in 110° C. oven for ~5 minutes, then UV-cured under N$_2$ with H-bulb (100% power) at 20 feet per minute. The detailed coating formulations, coating quality were recorded in Table IX. The marker repellent, contact angle data and solvent results are summarized in Table X and XI.

TABLE IX

ATO Hardcoat Formulation with MeFBSE-MDI-HEA (FA-9) Additive

| Exp. No# | ATO-1 (30% solution) | FA-9 (30% solution) | Coating Quality |
|---|---|---|---|
| 22 | 99.0% | 1.0% | Good |
| 23 | 98.0% | 2.0% | Good |
| 24 | 95.0% | 5.0% | Good |

TABLE X

Marker Repellent and Contact Angle Data with Perfluoropolyether Additive*

| Exp. No# | Sharpie Test | King Size Test | Vis-à-vis Test | H$_2$O Contact Angle Adv/Rec/Static (°) | Oil Contact Angle Adv/Rec/Static (°) |
|---|---|---|---|---|---|
| 22 | 5 | 5 | 5 | Not measured | Not measured |
| 23 | 1 | 1 | 1 | 118/100/107 | 75/69/72 |
| 24 | 1 | 1 | 1 | 118/87/115 | 70/55/66 |

TABLE XI

Solvent Resistance with Perfluoropolyether Additive on PET

| Exp. No# | IPA | Toluene | MIBK | Acetone | EtOAc | MEK | DMF |
|---|---|---|---|---|---|---|---|
| 22 | C/1 | C/1 | C/1 | C/1 | C/1 | C/1 | C/1 |
| 23 | C/1 | C/1 | C/1 | C/1 | C/1 | C/1 | C/1 |

4. Properties of Solar Control Article

A multilayer film containing about 446 layers was made on a sequential flat-film making line via a coextrusion process. This multilayer polymer film was made from coPEN and PETG (available from Eastman Chemicals). The coPEN was polymerized with 90% PEN and 10% PET starting monomers. A feedblock method (such as that described by U.S. Pat. No. 3,801,429) was used to generate about 223 optical layers with an approximately linear layer thickness gradient from layer to layer through the extrudate.

The coPEN was delivered to the feedblock by an extruder at a rate of about 132 lb/hr and the PETG at about 160 lb/hr. A portion of the PETG is used as protective boundary layers (PBL's) on each side of the extrudate with about 32 lb/hr flow total. The material stream then passed though an asymmetric two times multiplier with a multiplier design ratio of about 1.25. Multiplier concepts and function are described in U.S. Pat. Nos. 5,094,788 and 5,094,793. The multiplier ratio is defined as the average layer thickness of layers produced in the major conduit divided by the average layer thickness of layers in the minor conduit. This multiplier ratio was chosen so as to provide a small overlap of the two reflectance bands created by the two sets of 223 layers. Each set of 223 layers has the approximate layer thickness profile created by the feedblock, with overall thickness scale factors determined by the multiplier and film extrusion rates. After the multiplier, skin layers were added at about 72 lbs/hour (total) that was fed from a third extruder. Then the material stream passed through a film die and onto a water cooled casting wheel.

The PETG melt process equipment was maintained at about 500° F., the coPEN (both optics and skin layers) melt process equipment was maintained at about 525° F., and the feedblock, multiplier, skin-layer meltstream, and die were maintained at about 525° F.

The feedblock used to make the film for this example was designed to give a linear layer thickness distribution with a 1.3:1 ratio of thickest to thinnest layers under isothermal conditions. Errors in this layer profile are corrected with the axial rod heater profile, as described in U.S. Pat. No. 6,827,886, which is incorporated by reference herein. The casting wheel speed was adjusted for precise control of final film thickness, and therefore, final bandedge position.

The inlet water temperature on the casting wheel was about 7° Celsius. A high voltage pinning system was used to pin the extrudate to the casting wheel. The pinning wire was about 0.17 mm thick and a voltage of about 6.5 kV was applied. The pinning wire was positioned manually by an operator about 3 to 5 mm from the web at the point of contact to the casting wheel to obtain a smooth appearance to the cast web. The cast web was continuously oriented by conventional sequential length orienter (LO) and tenter equipment. The web was length oriented to a draw ratio of about 3.8 at about 270° F. The film was preheated to about 255° F. in about 15 seconds in the tenter and drawn in the transverse direction to a draw ratio of about 3.5 at 270° F. The film was heat set in the tenter oven at a temperature of about 460° F. for about 30 seconds. The finished film had a final thickness of about 0.0035 inches.

The multilayer film, as prepared above was then coated with the "Control-2" formulation referred to in Table I above, dried, and cured as described above. The optical transmission and reflection spectra of the article were measured using a Lambda 19 spectrophotometer (Perkin Elmer, Boston Mass.). The spectra were then imported into Optics 4 and Windows 5.2 programs available from Lawrence Berkeley National Laboratories for analyzing thermal and optical properties of glazing systems. The programs can be downloaded from http://windows.lbl.gov/software/.

Solar heat gain coefficient ("SHGC") is the fraction of incident solar radiation admitted through a window, both directly transmitted and absorbed and subsequently released inward. SHGC is expressed as a number between 0 and 1. The lower a window's SHGC, the less solar heat it transmits. Table XII shows the solar performance of the article.

TABLE XII

Solar Performance of Article with Hardcoat from "Control-2" Formulation

| Visible Light Transmission (%) | Solar Heat Gain Co-efficient (SHGC) | Haze (%) | Total Solar Transmission (%) | Total Solar Reflection (%) | Total Solar Absorption (%) |
|---|---|---|---|---|---|
| 71 | 0.51 | 1 | 41 | 24 | 35 |

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:
1. An article comprising:
an infrared light reflecting multilayer film having alternating layers of a first polymer type and a second polymer type, wherein at least one of the alternating polymer layers is birefringent and oriented; and
a hardcoat layer disposed on the multilayer film, wherein said hardcoat layer comprises
the reaction product of a mixture comprising:
between 0.5-5.0 weight % of at least one curable, crosslinkable compound comprising a fluoro-containing moiety;
at least one curable, crosslinkable non-fluorinated compound;
an infrared absorbing material; and
a polymerization initiator
wherein the infrared absorbing material comprises infrared light absorbing nanoparticles dispersed in the hardcoat layer, wherein the nanoparticles comprise antimony tin oxide, indium tin oxide, or a combination thereof, and wherein the hardcoat layer has a static contact angle of water that is greater than 70 degrees, and a static contact angle of hexadecane that is greater than 50 degrees.
2. The article according to claim 1 further comprising a pressure sensitive adhesive layer disposed on the multilayer film, the pressure sensitive adhesive layer being disposed on the opposing surface of the multilayer film as the hardcoat layer.
3. The article according to claim 2 further comprising a release liner disposed on the pressure sensitive adhesive layer, the pressure sensitive adhesive layer disposed between the release liner and the multilayer film layer.
4. The article according to claim 1 further comprising a tear resistant multilayer film having alternating layers of a stiff polyester or copolyester and a ductile sebacic acid based co-polyester.
5. The article according to claim 1, wherein said hardcoat layer has a static contact angle of water that is greater than 90 degrees.
6. The article according to claim 1, wherein said hardcoat layer has a static contact angle of water that is greater than 100 degrees.
7. The article according to claim 1, wherein said hardcoat layer has a static contact angle of hexadecane that is greater than 60 degrees.
8. An article comprising:
an infrared light reflecting multilayer film having alternating layers of a first polymer type and a second polymer type, wherein at least one of the alternating polymer layers is birefringent and oriented; and
a hardcoat layer disposed on the multilayer film, wherein said hardcoat layer comprises the reaction product of a mixture comprising:
between 0.5-5.0 weight % of at least one curable, crosslinkable fluoro-acrylate-containing compound;
at least one curable, crosslinkable non-fluorinated compound;
infrared light absorbing nanoparticles, wherein the nanoparticles comprise tin, antimony, indium or zinc oxides or doped oxides; and
a polymerization initiator.
9. The article according to claim 8, wherein the fluoro-acrylate-containing containing compound comprises a fluoroalkyl moiety or a perfluoropolyether moiety.
10. The article according to claim 9, wherein the fluoro-moiety is
a) $F(R_{fc}O)_xC_dF_{2d}-$ or $-C_dF_{2d}O(R_{fc}O)_xC_dF_{2d}$ wherein each $R_{fc}$ independently represents a fluorinated alkylene group having from 1 to 6 carbon atoms, each x independently represents an integer greater than or equal to 2, $C_dF_{2d}$ can be linear or branched, and wherein d is an integer from 1 to 8; or
b) $C_dF_{2d+1}$, wherein d is 1 to 8; or,
c) $CF_3CF_2CF_2CHFCF_2-$; $CF_3CHFO(CF_2)_3-$; $(CF_3)_2NCF_2CF_2-$; $CF_3CF_2CF_2OCF_2CF_2-$; $CF_3CF_2CF_2OCHCF_2-$; $n-C_3F_7OCF(CF_3)-$; $H(CF_2CF_2)_3-$; or $n-C_3F_7OCF(CF_3)CF_2OCF_2-$.
11. The article according to claim 8, wherein the fluoro-acrylate-containing compound is:

$$(R_fQXC(O)NH))_m-R_I-(NHC(O)OQ(A)_a)_n \quad \text{(Formula 1)}$$

wherein $R_i$ is a residue of a multi-isocyanate;
X is O, S or NR, where R is H or lower alkyl of 1 to 4 carbon atoms;
$R_f$ is a monovalent perfluoropolyether moiety composed of groups comprising the formula of $F(R_{fc}O)_xC_dF_{2d}-$ wherein each $R_{fc}$ independently represents a fluorinated alkylene group having from 1 to 6 carbon atoms;
x independently represents an integer greater than or equal to 2;

$C_dF_{2d}$ can be linear or branched, and d is an integer from 1 to 8;

Q is independently a connecting group with a valence of at least 2;

A is a (meth)acryl functional group —XC(O)C(R²)═CH₂, where R² is a lower alkyl of 1 to 4 carbon atoms or H or F, and X is as defined above;

m is at least 1;

n is at least 1; and a is 1 to 6, with the proviso that m+n is 2 to 10, and in which each unit referred to by the subscripts m and n is attached to an R$_i$ unit.

12. The article according to claim 1, wherein the fluoroacrylate-containing compound is

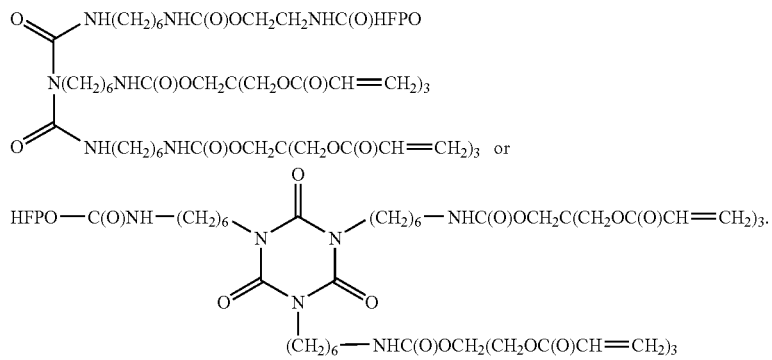

13. The article according to claim 8, wherein the fluoroacrylate-containing compound is

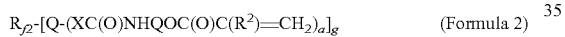 (Formula 2)

wherein R$_{f2}$ is either a monovalent perfluoropolyether moiety composed of groups comprising the formula F(R$_{fc}$O)$_x$C$_d$F$_{2d}$— or a divalent perfluoropolyether moiety composed of groups comprising the formula —C$_d$F$_{2d}$O(R$_{fc}$O)$_x$C$_d$F$_{2d}$—, wherein each R$_{fc}$ independently represents a fluorinated alkylene group having from 1 to 6 carbon atoms;

x independently represents an integer greater than or equal to 2;

$C_dF_{2d}$ can be linear or branched, and d is an integer from 1 to 8;

Q is independently a connecting group having a valence of at least 2;

X is O, S or NR, where R is H or lower alkyl of 1 to 4 carbon atoms;

R² is a lower alkyl of 1 to 4 carbon atoms or H or F;

a is from 1 to 6; and g is 1 or 2.

14. The article according to claim 13, wherein the fluoroacrylate-containing compound is HFPO—C(O)NHC₂H₄OC(O)NHC₂H₄OC(O)C(CH₃)═CH₂, HFPO—C(O)NHC(C₂H₅)(CH₂OC(O)NHC₂H₄OC(O)C(CH₃)═CH₂)₂, HFPO—[C(O)NHC₂H₄OC(O)NHC₂H₄OC(O)C(CH₃)═CH₂]₂, HFPO—[C(O)NHC(C₂H₅)(CH₂OC(O)NHC₂H₄OC(O)C(CH₃)═CH₂)₂]₂, HFPO—C(O)NHCH₂CH[OC(O)NHC₂H₄OC(O)C(CH₃)═CH₂]CH₂OC(O)NHC₂H₄OC(O)C(CH₃)═CH, HFPO—C(O)NHC(C₂H₅)(CH₂OC(O)NHC₂H₄OC(O)C(CH₃)═CH₂)₂, CH₂═C(CH₃)C(O)O C₂H₄NHC(O)OC₂H₄NHC(O)—HFPO—C(O)NHC₂H₄OC(O)NHC₂H₄OC(O)C(CH₃)═CH₂, HFPO—C(O)NH(C₂H₄N(C(O)NHC₂H₄OC(O)C(CH₃)═CH₂)₄C₂H₄NHC(O)—HFPO, or a combination thereof.

15. The article according to claim 8, wherein the fluoroacrylate-containing compound is

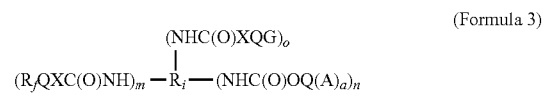 (Formula 3)

wherein R$_i$ is a residue of a multi-isocyanate;

X is O, S or NR, where R is H or lower alkyl of 1 to 4 carbon atoms;

R$_f$ is a monovalent perfluoropolyether moiety composed of groups comprising the formula F(R$_{fc}$O)$_x$C$_d$F$_{2d}$—, wherein each R$_{fc}$ independently represents a fluorinated alkylene group having from 1 to 6 carbon atoms;

x independently represents an integer greater than or equal to 2; and d is an integer from 1 to 8;

Q is independently a connecting group of valency at least 2;

A is a (meth)acryl functional group —XC(O)C(R²)═CH₂, where R² is a lower alkyl of 1 to 4 carbon atoms or H or F;

G is alkyl, aryl, alkaryl, aralkyl group, substituted alkyl/aryl group;

m is at least 1;

n is at least 1;

o is at least 1; and a is 2 to 6.

16. The article according to claim 8, wherein the fluoroacrylate-containing compound is

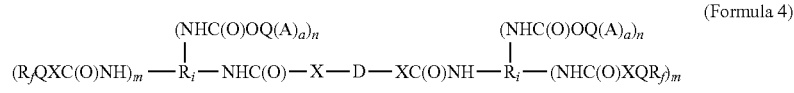 (Formula 4)

wherein $R_i$ is a residue of a multi-isocyanate;

X is O, S or NR, where R is H or lower alkyl of 1 to 4 carbon atoms;

$R^f$ is a monovalent perfluoropolyether moiety composed of groups comprising the formula $F(R_{fc}O)_x C_d F_{2d}$—, wherein each $R_{fc}$ independently represents a fluorinated alkylene group having from 1 to 6 carbon atoms;

x independently represents an integer greater than or equal to 2;

$C_d F_{2d}$ can be linear or branched, and d is an integer from 1 to 8;

Q is independently a connecting group of valency at least 2;

A is a (meth)acryl functional group —$XC(O)C(R^2)=CH_2$, where $R^2$ is a lower alkyl of 1 to 4 carbon atoms or H or F;

m is at least 1;

n is at least 1;

a is 1 to 6; and

D is a divalent or q-valent isocyanate reactive residue.

17. The article according to claim 8, wherein the fluoro-acrylate-containing compound is:

$$(R_{f2})—[(W)—(R_A)_a]_g \quad \text{(Formula 5)}$$

wherein $R_{f2}$ is a monovalent perfluoropolyether moiety composed of groups comprising the formula $F(R_{fc}O)_x C_d F_{2d}$—, or divalent perfluoropolyether group composed of groups comprising the formula —$C_d F_{2d} O (R_{fc}O)_x C_d F_{2d}$—, wherein each $R_{fc}$ independently represents a fluorinated alkylene group having from 1 to 6 carbon atoms;

x independently represents an integer greater than or equal to 2;

$C_d F_{2d}$ can be linear or branched, and d is an integer from 1 to 8;

W is a linking group; and $R_A$ is a free-radically reactive group;

a is 1 to 6, and g is 1 or 2.

18. The article according to claim 17, wherein the fluoroacrylate-containing compound is HFPO—[C(O)NHCH$_2$CH$_2$OC(O)CH=CH$_2$]$_{1\sim2}$, HFPO—[C(O)NHCH$_2$CH$_2$OCH$_2$CH$_2$OCH$_2$CH$_2$OC(O)CH=CH$_2$]$_{1\sim2}$, HFPO—[C(O)NH—(CH$_2$)$_6$OC(O)CH=CH]$_{1\sim2}$, HFPO—[C(O)NHC(CH$_2$OC(O)CH=CH$_2$)$_3$]$_{1\sim2}$, HFPO—[C(O)N(CH$_2$CH$_2$OC(O)CH=CH$_2$)$_2$]$_{1\sim2}$, HFPO—[C(O)NHCH$_2$CH$_2$N(C(O)CH=CH$_2$)CH$_2$OC(O)CH=CH$_2$]$_{1\sim2}$, HFPO—[C(O)NHC(CH$_2$OC(O)CH=CH$_2$)$_2$H]$_{1\sim2}$, HFPO—[C(O)NHC(CH$_2$OC(O)CH=CH$_2$)$_2$CH$_3$]$_{1\sim2}$, HFPO—[C(O)NHC(CH$_2$OC(O)CH=CH$_2$)$_2$CH$_2$CH$_3$]$_{1\sim2}$, HFPO—[C(O)NHCH$_2$CH(OC(O)CH=CH$_2$)CH$_2$OC(O)CH=CH$_2$]$_{1\sim2}$, HFPO—[C(O)NHCH$_2$CH$_2$CH$_2$N(CH$_2$CH$_2$OC(O)CH=CH$_2$)$_2$]$_{1\sim2}$, HFPO—[C(O)OCH$_2$C(CH$_2$OC(O)CH=CH$_2$)$_3$]$_{1\sim2}$, CH$_2$=CHC(O)OCH$_2$CH(OC(O)HFPO)CH$_2$OCH$_2$CH(OH)CH$_2$OCH$_2$CH(OC(O)HFPO)CH$_2$O COCH=CH$_2$, HFPO—CH$_2$O—CH$_2$CH(OC(O)CH=CH$_2$)CH$_2$OC(O)CH=CH$_2$; HFPO—[CH$_2$O—CH$_2$CH(OC(O)CH=CH$_2$)CH$_2$OC(O)CH=CH$_2$]$_2$; HFPO—C(O)N(H)CH$_2$CH(OC(O)CH=CH$_2$)CH$_2$OC(O)CH=CH$_2$, (ArO)CH$_2$CH(OAr)CH$_2$NHC(O)—HFPO—C(O)NHCH$_2$CH(OAr)CH$_2$OAr, HFPO—C(O)N(H)CH$_2$CH$_2$OC(O)C(CH$_3$)=CH$_2$, CH$_2$=CHC(O)OCH$_2$CF$_2$O(CF$_2$CF$_2$O)$_{x1}$(CF$_2$O)$_{x2n}$CH$_2$OC(O)CH=CH$_2$, HFPO—[C(O)NHCH$_2$CH$_2$OC(O)CH$_2$SH]$_{1\sim2}$, HFPO—[C(O)NHCH$_2$CH=CH$_2$]$_{1\sim2}$, HFPO—[C(O)NHCH$_2$CH$_2$OCH=CH$_2$]$_{1\sim2}$, HFPO—CH$_2$OC(O)CH=CH$_2$, HFPO—CH$_2$CH$_2$OC(O)CH=CH$_2$, HFPO—CH$_2$CH$_2$OC(O)C(CH$_3$)=CH$_2$, HFPO—CH$_2$CH$_2$OCH$_2$CH$_2$OC(O)CH=CH$_2$, or combinations thereof.

19. The article according to claim 8, wherein the fluoroacrylate-containing compound is:

$$R_{f3}\text{-J-OC(O)NH—K—HNC(O)O—}(C_bH_{2b})\text{CH}_{(3-v)}((C_yH_{2y})\text{OC(O)C}(R^2)=\text{CH}_2)_v \quad \text{(Formula 6)}$$

wherein, $R_{f3}$ is $C_d F_{2d+1}$, wherein d is 1 to 8, or $CF_3CF_2CF_2CHFCF_2$—, $CF_3CHFO(CF_2)_3$—, $(CF_3)_2NCF_2CF_2$—, $CF_3CF_2CF_2OCF_2CF_2$—, $CF_3CF_2CF_2OCHF_2$—, n-$C_3F_7OCF(CF_3)$—, $H(CF_2CF_2)_3$—, or n-$C_3F_7OCF(CF_3)CF_2OCF_2$—;

J is 
—$SO_2$—$\underset{R}{N}$—$C_hH_{2h}$—,
—$C(O)$—$\underset{R}{N}$—$C_hH_{2h}$—,   —$C_hH_{2h}$—,
—$O(CH_2)_h$—,   —$(CH_2)_h$—O—$(CH_2)_j$—,   or
—$(CH_2)_h$—S—$(CH_2)_j$—;

wherein R is H or an alkyl group of 1 to 4 carbon atoms;

h is 2 to 8;

j is 1 to 5;

y is 0 to 6;

K is the residue of a diisocyanate with an unbranched symmetric alkylene group, arylene group, or aralkylene group;

b is 1 to 30;

y is 1 to 5;

v is 1 to 3; and $R^2$ is H, CH$_3$, or F.

20. The article according to claim 19, wherein the fluoroacrylate-containing compound is $C_4F_9SO_2N(CH_3)C_2H_4O$—C(O)NHC$_6$H$_5$CH$_2$C$_6$H$_5$NHC(O)—OC$_2$H$_4$OC(O)CH=CH$_2$ (MeFBSE-MDI-HEA), $C_4F_9SO_2N(CH_3)C_2H_4O$—C(O)NH(CH$_2$)$_6$NHC(O)—OC$_2$H$_4$OC(O)Me=CH$_2$ (MeFBSE-HDI-HEMA), $C_4F_9SO_2N(CH_3)C_2H_4O$—C(O)NH(CH$_2$)$_6$NHC(O)—OC$_4$H$_8$OC(O)CH=CH$_2$ (MeFBSE-HDI-BA), $C_4F_9SO_2N(CH_3)C_2H_4$)—C(O)NH(CH$_2$)$_6$NHC(O)—OC$_{12}$H$_{24}$OC(O)CH=CH$_2$ (MeFBS-HDI-DDA), $CF_3CH_2O$—C(O)NHC$_6$H$_5$CH$_2$C$_6$H$_5$NHC(O)—OC$_2$H$_4$OC(O)CH=CH$_2$ (CF$_3$CH$_2$OH-MDI-HEA), $C_4F_9CH_2CH_2O$—C(O)NHC$_6$H$_5$CH$_2$C$_6$H$_5$NHC(O)—OC$_2$H$_4$OC(O)CH=CH$_2$ ($C_4F_9CH_2CH_2OH$-MDI-HEA), $C_6F_{13}CH_2CH_2O$—C(O)NHC$_6$H$_5$CH$_2$C$_6$H$_5$NHC(O)—OC$_2$H$_4$OC(O)CH=CH$_2$ ($C_6F_{13}CH_2CH_2OH$—MDI—HEA), $C_3F_7CHFCF_2CH_2O$—C(O)NHC$_6$H$_5$CH$_2$C$_6$H$_5$NHC(O)—OC$_2$H$_4$OC(O)CH=CH$_2$ ($C_3F_7CHFCF_2CH_2OH$-MID-HEA), $CF_3CHFO(CF_2)_3CH_2O$—C(O)NHC$_6$H$_5$CH$_2$C$_6$H$_5$NHC(O)—OC$_2$H$_4$OC(O)CH=CH$_2$($CF_3CHFO(CF_2)_3CH_2O$-MDI—HEA), $C_3F_7OCHFCF_2CH_2O$—C(O)NHC$_6$H$_5$CH$_2$C$_6$H$_5$NHC(O)—OC$_2$H$_4$OC(O)CH=CH$_2$ ($C_3F_7OCHFCF_2CH_2OH$-MDI—HEA), $C_3F_7OCF(CF_3)CH_2O$—C(O)NHC$_6$H$_5$CH$_2$C$_6$H$_5$NHC(O)—OC$_2$H$_4$OC(O)CH=CH$_2$ ($C_3F_7OCF(CF_3)CH_2OH$-MDI—HEA), $C_4F_9SO_2NMeC_2H_4O$—C(O)NHC$_6$H$_4$CH$_2$C$_6$H$_4$NHC(O)—OCH$_2$C(CH$_2$OC(O)CH=CH$_2$)$_3$ (MeFBSE-MDI-(SR-444C)), or combinations thereof.

21. The article according to claim 8 further comprising a pressure sensitive adhesive layer disposed on the multilayer film, the pressure sensitive adhesive layer being disposed on the opposing surface of the multilayer film as the hardcoat layer.

22. The article according to claim 21 further comprising a release liner disposed on the pressure sensitive adhesive layer, the pressure sensitive adhesive layer disposed between the release liner and the multilayer film layer.

23. The article according to claim 8 further comprising a tear resistant polymeric film.

24. A light control article for blocking infrared light from an infrared light source comprising:

an infrared light reflecting multilayer film having alternating layers of a first polymer type and a second polymer type; wherein at least one of the alternating polymer layers is birefrinent and oriented;

a hardcoat layer disposed on the multilayer film, wherein said hardcoat layer comprises the reaction product of a mixture comprising:

between 0.5-5.0 weight % of a curable, crosslinkable fluoro-acrylate-containing compound;

a curable, crosslinkable non-fluorinated organic compound;

infrared light absorbing nanoparticles, wherein the nanoparticles comprise tin, antimony, indium or zinc oxides or doped oxides; and a polymerization initiator; and a substrate disposed adjacent the infrared light reflecting multilayer film.

25. The light control article according to claim 24 further comprising a pressure sensitive adhesive layer disposed between the infrared light reflecting multilayer film and the glass substrate.

26. The light control article according to claim 24 further comprising a tear resistant polymeric film.

27. The light control article according to claim 24, wherein the hardcoat layer has a thickness in a range from 1 to 20 micrometers.

* * * * *

UNITED STATES PATENT AND TRADEMARK OFFICE
CERTIFICATE OF CORRECTION

PATENT NO. : 8,530,054 B2
APPLICATION NO. : 11/528159
DATED : September 10, 2013
INVENTOR(S) : Raghunath Padiyath It is certified that error appears in the above-identified patent and that said Letters Patent is hereby corrected as shown below:

In the Specification

Column 2
Line 7, Delete "$R_fQXC(O)NH))_m$—$R_i$—$(NHC(O)OQ(A)_a)_n$" and insert
-- $(R_fQXC(O)NH)_m$—$R_i$—$(NHC(O)OQ(A)_a)_n$ --, therefor
Line 62, Delete "8;" and insert -- 8. --, therefor.

Column 3
Line 35, Delete "(Formula 5)" and insert -- (Formula 2) --, therefor.

Column 4
Line 50, Delete "brianched" and insert -- branched --, therefor.

Column 5
Line 32, Delete "$CH_2OCH_2$ $CH_2OC(O)CH$" and insert -- $CH_2OCH_2CH_2OCH_2CH_2OC(O)CH$ --, therefor.

Column 7
Line 62, Delete ""about."0" and insert -- "about." --, therefor.

Column 13
Line 62, Delete ""about."0" and insert -- "about." --, therefor.

Column 14
Line 21, Delete "8;" and insert -- 8. --, therefor.

Column 16
Line 40-41, Delete "HFPO-polymercapotan" and insert -- HFPO-polymercaptan --, therefor.
Line 50, Delete "$C(O)O$ $C_2$" and insert -- $C(O)OC_2$ --, therefor.

Signed and Sealed this
Fourteenth Day of April, 2015

Michelle K. Lee
*Director of the United States Patent and Trademark Office*

Column 17
Line 17, Delete "thereof" and insert -- thereof. --, therefor.
Line 24, Delete "alkly" and insert -- alkyl --, therefor.
Line 67, Delete "(A)a-Q-OH." and insert -- $(A)_a$-Q-OH. --, therefor.

Column 19
Lines 1-2, Delete "heteralkylene" and insert -- heteroalkylene --, therefor.

Column 21
Line 30, Delete "no" and insert -- or --, therefor.

Column 22
Line 5, Delete "polyfluroalkyl" and insert -- polyfluoroalkyl --, therefor.
Line 7, Delete "perfluroalkyl" and insert -- perfluoroalkyl --, therefor.
Line 15, Delete "embodiment" and insert -- embodiment, --, therefor.

Column 23
Line 16, Delete "$CH_2$ $C_6H_5$" and insert -- $CH_2C_6H_5$ --, therefor.
Line 44, Delete "diazobicyclo" and insert -- diazabicyclo --, therefor.

Column 24
Line 5, Delete "polyfluroalkyl" and insert -- polyfluoroalkyl --, therefor.
Line 7, Delete "perfluroalky" and insert -- perfluoroalkyl --, therefor.

Column 25
Line 5, Delete "$CF_2)_3$)OH," and insert -- $CF_2)_3$OH, --, therefor.
Line 65, Delete "an" and insert -- and --, therefor.

Column 27
Line 35-36, Delete "dimethylformaide" and insert -- dimethylformamide --, therefor.

Column 28
Line 45, Delete "polystryrene)," and insert -- polystyrene), --, therefor.

Column 29
Line 38, Delete "O)xC" and insert -- $O)_xC$ --, therefor.

Column 30
Line 22, Delete ""SR3551"," and insert -- "SR351", --, therefor.
Line 37, Delete "4O1)" and insert -- 401) --, therefor.

Column 32
Line 53, After "58.5%" insert -- . --.

CERTIFICATE OF CORRECTION (continued)
U.S. Pat. No. 8,530,054 B2

Column 33
Line 16, After "10.5" insert -- . --.
Line 50, Delete "straigt" and insert -- straight --, therefor.

Column 34
Line 14, Delete "Hatsfield," and insert -- Hatfield, --, therefor.

Column 35
Line 53, After "performance" insert -- . --.

Column 36
Line 11, Delete "Connol-1" and insert -- Control-1 --, therefor.
Line 23, Delete "art" and insert -- in part --, therefor.
Line 57, Delete "testign" and insert -- testing --, therefor.

Column 39
Line 26, Delete "divinyltetamethydisiloxane" and insert -- divinyltetramethyldisiloxane --, therefor.
Line 35, Delete "solvent" and insert -- solvent resistant --, therefor.

Column 40
Line 29, Delete "though" and insert -- through --, therefor.

In the Claims

Column 42
Line 39, In Claim 9, delete "containing containing" and insert -- containing --, therefor.
Line 58, In Claim 11, delete "$R_fQXC(O)NH))_m$—$R_i$—$(NHC(O)OQ(A)_a)_n$" and insert
-- $(R_fQXC(O)NH)_m$—$R_i$—$(NHC(O)OQ(A)_a)_n$ --, therefor
Line 60, In Claim 11, delete "1to" and insert -- 1 to --, therefor.

Column 43
Line 14, In Claim 12, delete "1," and insert -- 11, --, therefor.
Line 42, In Claim 13, delete "$R_{fC}$" and insert -- $R_{fc}$ --, therefor.
Line 48, In Claim 13, delete "havinga" and insert -- having a --, therefor.

Column 44
Line 6, In Claim 14, delete "O C$_2$" and insert -- OC$_2$ --, therefor.

Column 45
Line 4, In Claim 16, delete "$R^f$" and insert -- $R_f$ --, therefor.
Line 56, In Claim 18, delete "CH$_2$O COCH" and insert -- CH$_2$OCOCH --, therefor.

CERTIFICATE OF CORRECTION (continued)
U.S. Pat. No. 8,530,054 B2

Column 46
Line 11, In Claim 19, delete "$OCHF_2$—," and insert -- $OCHCF_2$—, --, therefor.
Line 43, In Claim 20, delete "$C_2H_4$)" and insert -- $C_2H_4O$ --, therefor.
Line 44, In Claim 20, delete "(MeFBS" and insert -- (MeFBSE --, therefor.
Line 52, In Claim 20, delete "MID" and insert -- MDI --, therefor.

Column 47
Line 12, In Claim 24, delete "type;" and insert -- type, --, therefor.
Line 12, In Claim 24, delete "birefrinent" and insert -- birefringent --, therefor.

Column 48
Line 12, In Claim 25, before "substrate." delete "glass".